(12) United States Patent  (10) Patent No.: US 8,371,861 B1
Cina et al.  (45) Date of Patent: Feb. 12, 2013

(54) STRADDLE MOUNT CONNECTOR FOR A PLUGGABLE TRANSCEIVER MODULE

(75) Inventors: Michael Frank Cina, Elizabethtown, PA (US); Randall Robert Henry, Harrisburg, PA (US); Michael J. Phillips, Camp Hill, PA (US); David Szczesny, Hershey, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/197,467

(22) Filed: Aug. 3, 2011

(51) Int. Cl.
*H01R 12/00* (2006.01)
(52) U.S. Cl. ............. 439/62; 439/79; 361/715; 257/215
(58) Field of Classification Search .................... 439/62, 439/79, 638, 92, 607.05, 607.28, 607.3, 487, 439/95, 98, 108, 608, 948, 540.1, 541.5; 361/715, 719, 707; 257/215, 217, 219, 726, 257/727
See application file for complete search history.

(56) References Cited

U.S. PATENT DOCUMENTS

| | | | | |
|---|---|---|---|---|
| 4,824,383 | A * | 4/1989 | Lemke | 439/108 |
| 6,231,355 | B1 * | 5/2001 | Trammel et al. | 439/79 |
| 6,638,111 | B1 * | 10/2003 | McDaid et al. | 439/607.09 |
| 6,666,696 | B1 * | 12/2003 | Wu | 439/108 |
| 6,816,376 | B2 | 11/2004 | Bright et al. | |
| 6,980,437 | B2 | 12/2005 | Bright | |
| 7,001,217 | B2 | 2/2006 | Bright et al. | |
| 7,179,127 | B2 * | 2/2007 | Shiu | 439/607.35 |
| 7,232,345 | B2 * | 6/2007 | Ishizuka et al. | 439/660 |
| 7,438,596 | B2 | 10/2008 | Phillips | |
| 7,539,018 | B2 | 5/2009 | Murr et al. | |
| 7,625,223 | B1 | 12/2009 | Fogg | |
| 2010/0210124 | A1 * | 8/2010 | Li | 439/108 |

* cited by examiner

*Primary Examiner* — Edwin A. Leon
*Assistant Examiner* — Harshad Patel

(57) ABSTRACT

A straddle mount connector is provided for edge mounting to a circuit board of a pluggable module. The straddle mount connector includes a dielectric connector body having a base and a plug extending from the base. The base is configured to be coupled to an edge of the circuit board. The plug has opposite first and second sides and a plate cavity that extends within the plug between the first and second sides. The plug is configured to be received within a receptacle of a receptacle connector. Electrical contacts are held by the connector body. The electrical contacts include mating segments. The mating segments of a first group of the electrical contacts are arranged in a first row that extends a length along the first side of the plug. The mating segments of a second group of the electrical contacts are arranged in a second row that extends a length along the second side of the plug. A ground plate is held within the plate cavity of the plug of the connector body. The ground plate extends between the first and second rows of electrical contacts along the lengths of the first and second rows.

20 Claims, 15 Drawing Sheets

STRADDLE MOUNT CONNECTOR FOR A PLUGGABLE TRANSCEIVER MODULE

BACKGROUND OF THE INVENTION

The subject matter described and/or illustrated herein relates generally to transceiver assemblies.

Various types of fiber optic and copper based transceiver assemblies that permit communication between host equipment and external devices are known. These transceiver assemblies typically include a module assembly that can be pluggably connected to a receptacle connector in the host equipment. The module assemblies are constructed according to various standards for size and compatibility, one standard being the Quad Small Form-factor Pluggable (QSFP) module standard. Conventional QSFP modules and receptacle assemblies perform satisfactorily conveying data signals at rates up to 10 gigabits per second (Gbps). Another pluggable module standard, the XFP standard, calls for the transceiver module to also convey data signals at rates up to 10 Gbps.

As electrical and optical devices become smaller, the signal paths thereof become more densely grouped. Moreover, the rate at which the data signals propagate along the signal paths is continually increasing to satisfy the demand for faster devices. Accordingly, there is a demand for transceiver assemblies that can handle the increased signal rates and/or that have a higher density of signal paths. However, because of the increased signal rates and/or higher density, differential pairs of signal contacts within a transceiver assembly may interfere with each other, which is commonly referred to as "crosstalk". For example, adjacent differential pairs in the same row and/or differential pairs in opposing rows may experience crosstalk. Such crosstalk can become a relatively large contributor to errors along the signal paths of the transceiver assembly. Coupling between signal contacts within the same differential pair may also contribute to errors along the signal paths of the transceiver assembly. Moreover, the increased signal rates and/or higher density may make it difficult to maintain a desired impedance value of the transceiver assembly, which may result in impedance discontinuities between the transceiver assembly and the host equipment and/or the external device.

BRIEF DESCRIPTION OF THE INVENTION

In one embodiment, a straddle mount connector is provided for edge mounting to a circuit board of a pluggable module. The straddle mount connector includes a dielectric connector body having a base and a plug extending from the base. The base is configured to be coupled to an edge of the circuit board. The plug has opposite first and second sides and a plate cavity that extends within the plug between the first and second sides. The plug is configured to be received within a receptacle of a receptacle connector. Electrical contacts are held by the connector body. The electrical contacts include mating segments. The mating segments of a first group of the electrical contacts are arranged in a first row that extends a length along the first side of the plug. The mating segments of a second group of the electrical contacts are arranged in a second row that extends a length along the second side of the plug. A ground plate is held within the plate cavity of the plug of the connector body. The ground plate extends between the first and second rows of electrical contacts along the lengths of the first and second rows.

In another embodiment, a straddle mount connector is provided for edge mounting to a circuit board of a pluggable module. The straddle mount connector includes a dielectric connector body having a base and a plug extending from the base. The base is configured to be coupled to an edge of the circuit board. The plug has a side and is configured to be received within a receptacle of a receptacle connector. First and second signal contacts are held by the connector body and include signal mating segments that are configured to mate with signal mating contacts of the receptacle connector. A ground contact is held by the connector body and includes a ground mating segment that is configured to mate with a ground mating contact of the receptacle connector. The signal and ground mating segments include opposite broad-side surfaces and opposite edge-side surfaces that extend between the broad-side surfaces. The broad-side surfaces have a greater surface area than the edge-side surfaces. The ground mating segments being arranged between the signal mating segments of the first and second signal contacts. One of the broad-side surfaces of the ground mating segment faces an edge-side surface of the first signal contact and the other broad-side surface of the ground mating segment faces an edge-side surface of the second signal contact.

In a further embodiment, a straddle mount connector is provided for edge mounting to a circuit board of a pluggable module. The straddle mount connector includes a dielectric connector body having a base and a plug extending from the base. The base is configured to be coupled to an edge of the circuit board. The plug has opposite first and second sides. The plug is configured to be received within a receptacle of a receptacle connector. Ground contacts are held by the connector body and include mating segments. The mating segments of a first group of the ground contacts are arranged in a first row that extends along the first side of the plug. The mating segments of a second group of the ground contacts are arranged in a second row that extends along the second side of the plug. At least one ground contact within the first group is engaged with and electrically connected to at least one ground contact within the second group such that the at least one ground contact within the first group is electrically common to the at least one ground contact within the second group.

DETAILED DESCRIPTION OF THE INVENTION

Figure 1:
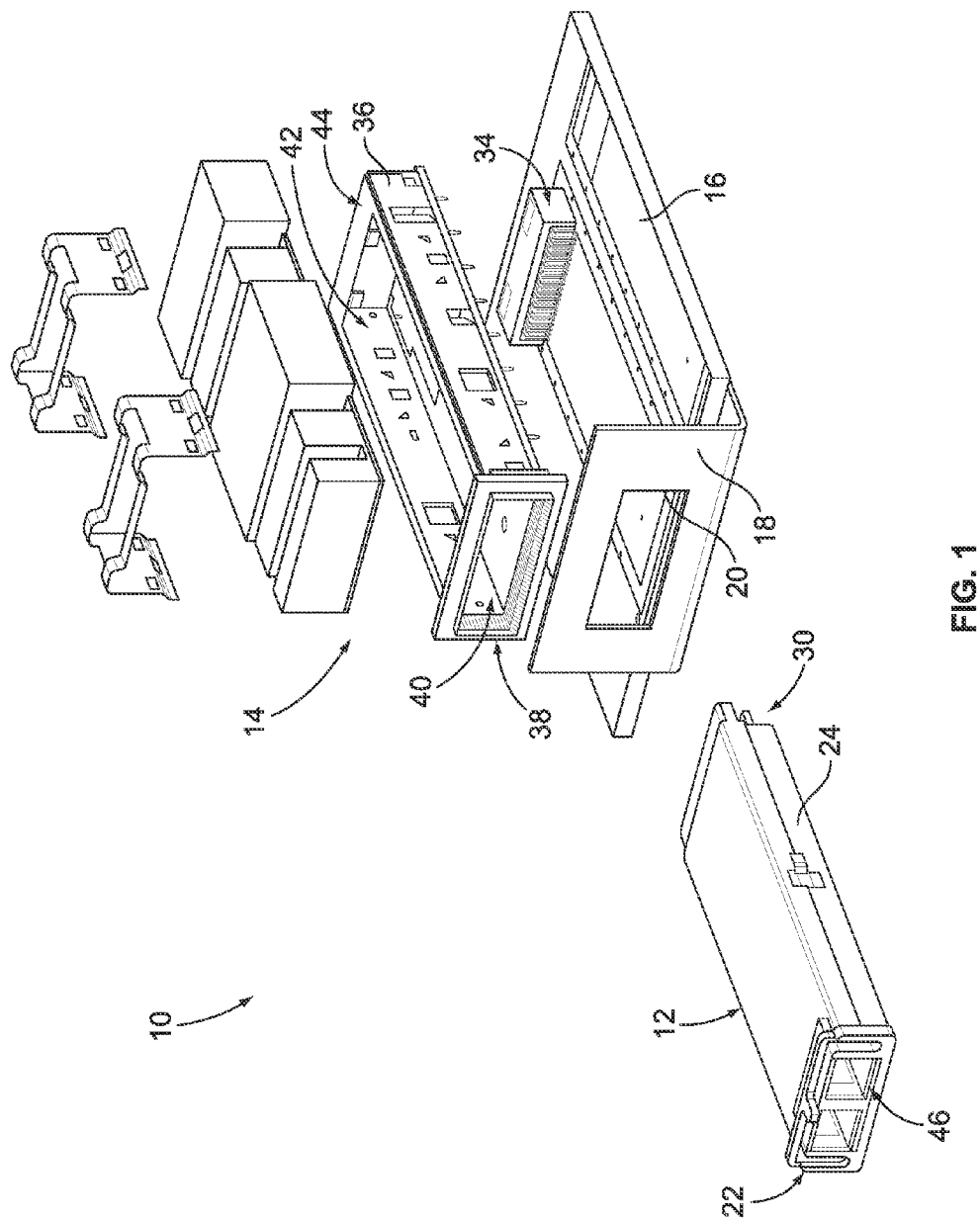
FIG. 1 is an exploded perspective view of an exemplary embodiment of a transceiver assembly.

FIG. 1 is a perspective view of a portion of an exemplary embodiment of a transceiver assembly 10. In the exemplary embodiment, the transceiver assembly 10 is adapted to address, among other things, conveying data signals at high rates, such as data transmission rates of at least 10 gigabits per second (Gbps), which is required by the SFP+ standard. For example, in some embodiments the transceiver assembly 10 is adapted to convey data signals at a data transmission rate of at least 28 Gbps. Moreover, and for example, in some embodiments the transceiver assembly 10 is adapted to convey data signals at a data transmission rate of between approximately 20 Gbps and approximately 30 Gbps. It is appreciated, however, that the benefits and advantages of the subject matter described and/or illustrated herein may accrue equally to other data transmission rates and across a variety of systems and standards. In other words, the subject matter described and/or illustrated herein is not limited to data transmission rates of 10 Gbps or greater, any standard, or the exemplary type of transceiver assembly shown and described herein.

The transceiver assembly 10 includes a pluggable module 12 configured for pluggable insertion into a receptacle assembly 14 that is mounted on a host circuit board 16. The host circuit board 16 may be mounted in a host system (not shown) such as, but not limited to, a router, a server, a computer, and/or the like. The host system typically includes a conductive chassis having a bezel 18 including an opening 20 extending therethrough in substantial alignment with the receptacle assembly 14. The receptacle assembly 14 is optionally electrically connected to the bezel 18.

The pluggable module 12 is configured to be inserted into the receptacle assembly 14. Specifically, the pluggable module 12 is inserted into the receptacle assembly 14 through the bezel opening 20 such that a front end 22 of the pluggable module 12 extends outwardly from the receptacle assembly 14. The pluggable module 12 includes a housing 24 that forms a protective shell for a circuit board 26 (FIGS. 2 and 3) that is disposed within the housing 24. The circuit board 26 carries circuitry, traces, paths, devices, and/or the like that perform transceiver functions in a known manner. An edge 28 (FIGS. 2 and 3) of the circuit board 26 is exposed at a rear end 30 of the housing 24. In an exemplary embodiment, a connector 32 (FIGS. 2-6) is mounted to the circuit board 26 and exposed through the rear end 30 of the housing 24 for plugging into a receptacle connector 34 of the receptacle assembly 14, as will be described below. The connector 32 is not shown in FIG. 1. In alternative to the connector 32, the circuit board 26 of the pluggable module 12 may directly mate with the receptacle connector 34. In other words, in some alternative embodiments, the edge 28 of the circuit board 26 of the pluggable module 12 is received within a receptacle 50 of the receptacle connector 34 to electrically connect the pluggable module 12 to the receptacle connector 34. The pluggable module 12, the circuit board 26, and/or the connector 32 may be referred to herein as a "mating connector".

In general, the pluggable module 12 and the receptacle assembly 14 may be used in any application requiring an interface between a host system and electrical and/or optical signals. The pluggable module 12 interfaces to the host system through the receptacle assembly 14 via the receptacle connector 34 of the receptacle assembly 14, which is located within a receptacle guide frame 36, also referred to as a cage. As illustrated in FIG. 1, the guide frame 36 includes a front end 38 having a front opening 40 that is open to an interior space 42 of the guide frame 36. The receptacle connector 34 is positioned within the interior space 42 at a rear 44 of the guide frame 36. The interior space 42 of the guide frame 36 is configured to receive the pluggable module 12 therein in electrical connection with the receptacle connector 34.

The pluggable module 12 interfaces to one or more optical cables (not shown) and/or one or more electrical cables (not shown) through a connector interface 46 at the front end 22. Optionally, the connector interface 46 comprises a mechanism that cooperates with a fiber or cable assembly (not shown) to secure the fiber or cable assembly to the pluggable module 12. Suitable connector interfaces 46 are known and include adapters for the LC style fiber connectors and the MTP/MPO style fiber connectors offered by Tyco Electronics Corporation (Harrisburg, Pa.).

Figure 2:
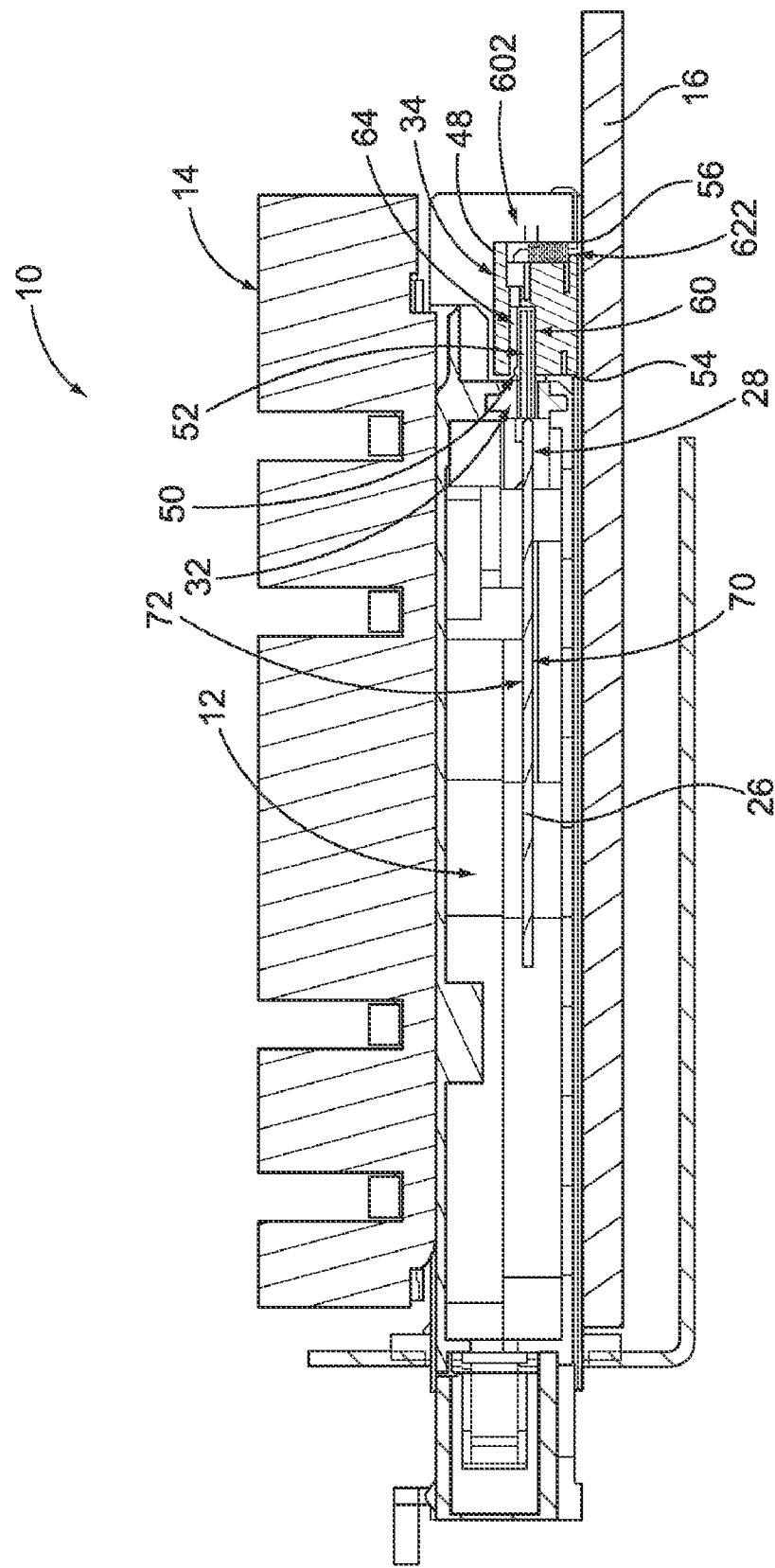
FIG. 2 is a cross-sectional view of the transceiver assembly shown in FIG. 1 illustrating an exemplary embodiment of a pluggable module mated with an exemplary embodiment of a receptacle assembly.

FIG. 2 is a cross-sectional view of the transceiver assembly 10 illustrating the pluggable module 12 mated with the receptacle assembly 14. The receptacle connector 34 is mounted on the host circuit board 16. The receptacle connector 34 includes a dielectric connector body 48 having the receptacle 50. A straddle mount connector 32 is mounted to the edge 28 of the circuit board 26 and is electrically connected thereto, as described in further detail below.

The receptacle 50 of the receptacle connector 34 receives a plug 52 of the straddle mount connector 32 therein. The receptacle connector 34 includes electrical contacts 54 and electrical contacts 56. The electrical contacts 54 extend within the receptacle 50 and engage corresponding electrical contacts 58 (FIGS. 3 and 5) on a side 60 of the plug 52 of the straddle mount connector 32. The electrical contacts 56 also extend within the receptacle 50, but the electrical contacts 56 engage corresponding electrical contacts 62 (FIGS. 3-7) on a side 64 of the plug 52 that is opposite the side 60. The electrical contacts 58 and 62 of the straddle mount connector 32 are electrically connected to corresponding electrically conductive contact pads 66 and 68 (FIG. 3) on opposite sides 70 and 72, respectively, of the circuit board 26 to establish an electrical connection between the circuit board 26 and the host circuit board 16. The electrical contacts 54 may be referred to herein as an "auxiliary contacts". The contact pads 66 and/or 68 may be referred to herein as "mating contacts" and/or "contacts". Each side 60 and 64 of the plug 52 may be referred to herein as a "first side" and/or a "second side".

Figure 3:
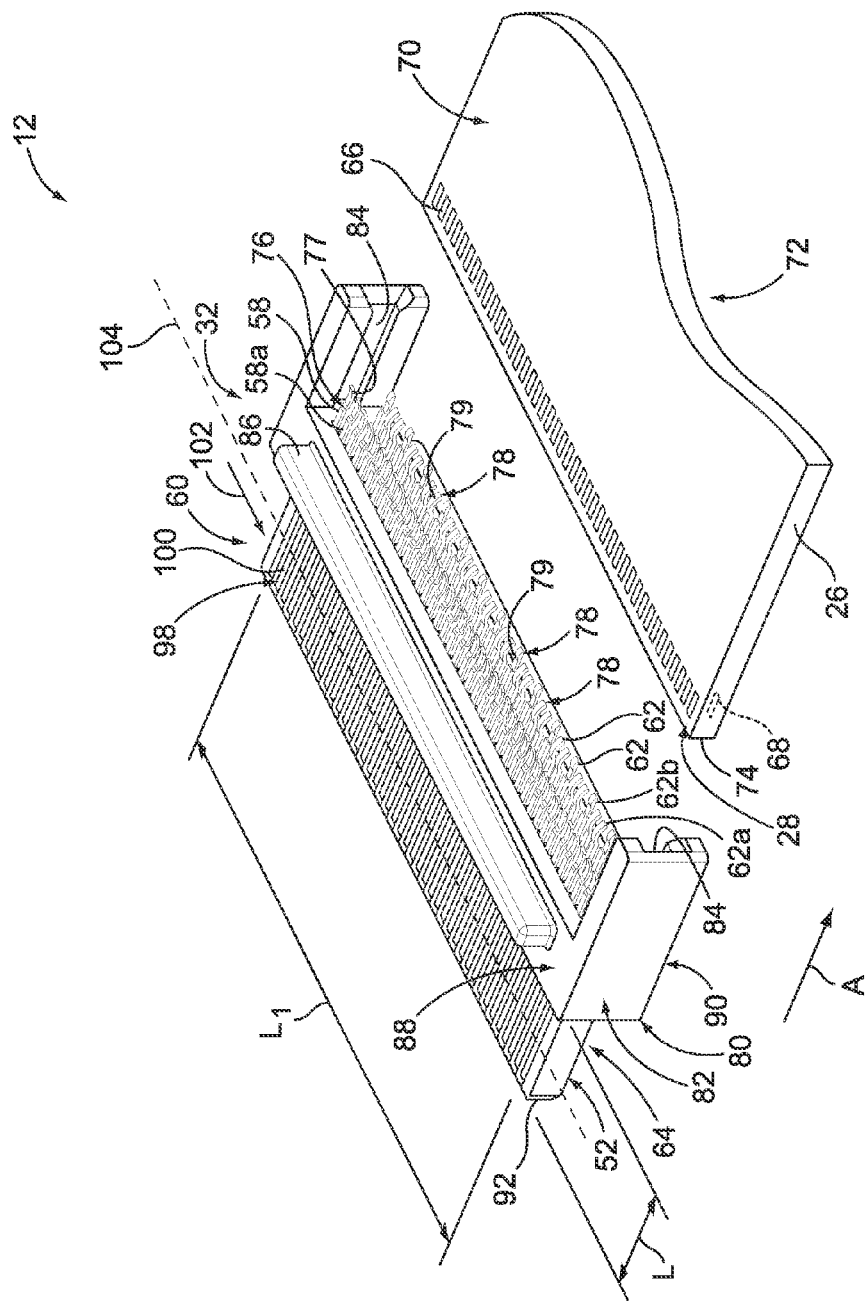
FIG. 3 is an exploded view of a portion of the pluggable module shown in FIG. 2 illustrating an exemplary embodiment of a circuit board and an exemplary embodiment of a straddle mount connector for mounting to the circuit board.

FIG. 3 is an exploded view of a portion of the pluggable module 12 illustrating the circuit board 26 and the straddle mount connector 32. The circuit board 26 includes the opposite sides 70 and 72 and the edge 28. The edge 28 includes an edge surface 74 and portions of the sides 70 and 72 that extend proximate the edge surface 74. The contact pads 66 are arranged on the side 70 of the circuit board 26 along the edge 28. The contact pads 68 are arranged on the side 72 along the edge 28.

The straddle mount connector 32 is configured to be mounted to the edge 28 of the circuit board 26. For example, the straddle mount connector 32 is loaded onto the edge 28 in a loading direction A. The electrical contacts 58 of the straddle mount connector 32 include mounting segments 76 having mounting interfaces 77 that engage corresponding ones of the contact pads 66 on the side 70 of the circuit board 26. The electrical contacts 62 include mounting segments 78 having mounting interfaces 79 that engage corresponding ones of the contact pads 68 on the side 72 of the circuit board 26. The mounting segments 76 and 78 of the electrical contacts 58 and 62, respectively, straddle the edge 28 of the circuit board 26 therebetween.

The straddle mount connector 32 includes a dielectric connector body 80 having a base 82 and the plug 52, which extends outwardly from the base 82. The base 82 is configured to be coupled to the edge 28 of the circuit board 26. In an exemplary embodiment, the base 82 receives a portion of the edge 28 of the circuit board 26 within slots 84 of the base 82 with an interference fit to securely couple the circuit board 26 to the base 82. However, the base 82 may be coupled to the edge 28 of the circuit board 26 using any other structure, means, connection type, and/or the like, such as, but not limited to, using a snap-fit connection, using a latch, a threaded or other fastener, an adhesive, and/or the like. Optionally, ribs 86 may extend from a side 88 and/or a side 90 of the base 82 for interfacing with the housing 24 (FIG. 1) of the pluggable module 12 (FIGS. 1 and 2). For example, the ribs 86 may be captured within the housing 24 of the pluggable module 12 when the pluggable module 12 is assembled to secure the straddle mount connector 32 with respect to the housing 24 at the rear end 30 (FIG. 1) thereof.

As described above, the plug 52 is configured to be received within the receptacle 50 (FIGS. 2 and 14) of the receptacle connector 34 (FIGS. 1, 2, and 14-16). The plug 52 includes the opposite sides 60 and 64. The plug 52 extends a length L outwardly from the base 82 to an end surface 92 of the plug 52. As will be described below, the plug 52 includes a plate cavity 94 (FIGS. 4 and 5) that receives a ground plate 96 (FIGS. 5-7) therein.

The electrical contacts 58 and 62 of the straddle mount connector 32 are held by the connector body 80. The electrical contacts 62 include signal contacts 62a and ground contacts 62b. The signal contacts 62a are configured to conduct electrical data signals, while the ground contacts 62b are configured to be electrically connected to a ground. Optionally, the electrical contacts 62 include one or more power contacts that are configured to conduct electrical power. In an exemplary embodiment, the electrical contacts 58 of the straddle mount connector 32 include signal contacts 58a but do not include ground contacts. However, in some alternative embodiments, the electrical contacts 58 include ground contacts. Optionally, the electrical contacts 58 include one or more power contacts that are configured to conduct electrical power. Each of the signal contacts 58a and 62a may be referred to herein as a "first" and/or a "second" signal contact.

The electrical contacts 58 of the straddle mount connector 32 include mating segments 98 having mating interfaces 100 at which the electrical contacts 58 engage the corresponding electrical contacts 54 (FIGS. 2 and 14) of the receptacle connector 34. Engagement between the mating interfaces 100 of the electrical contacts 58 and the corresponding electrical contacts 54 establishes an electrical connection between the connectors 32 and 34. The mating segments 98 of the electrical contacts 58 are arranged in a row 102 that extends a length $L_1$ along the side 60 of the plug 52. The row 102 extends the length $L_1$ along a row axis 104. The electrical contacts 58 may be referred to herein as a "first group" and/or a "second group". The row 102 may be referred to herein as a "first row" and/or a "second row". Each mating segment 98 may be referred to herein as a "ground mating segment".

Figure 4:
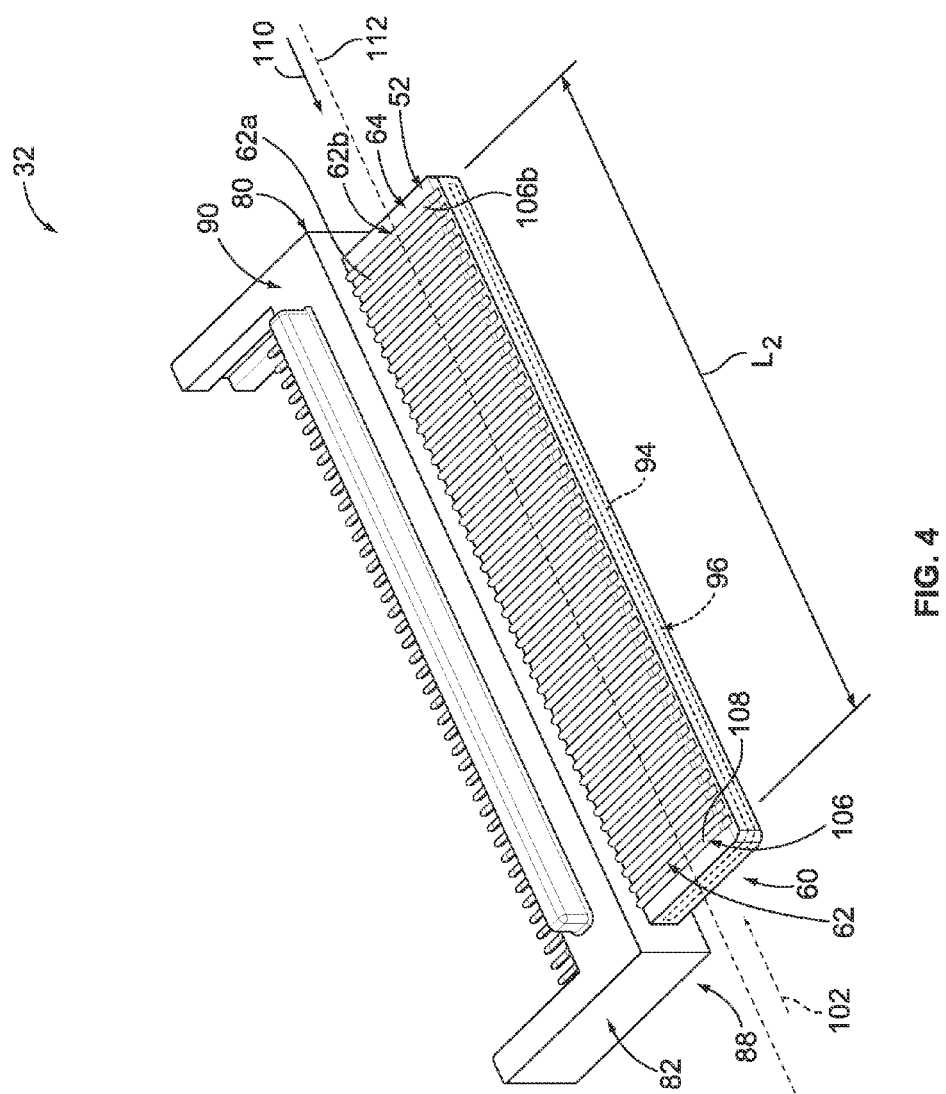
FIG. 4 is a perspective view of the straddle mount connector shown in FIG. 3 viewed from a different angle than FIG. 3.

FIG. 4 is a perspective view of the straddle mount connector 32 viewed from a different angle than FIG. 3. More specifically, FIG. 3 illustrates the sides 60 and 88 of the plug 52 and base 82, respectively, while FIG. 4 illustrates the sides 64 and 90 of the respective plug 52 and base 82. The electrical contacts 62 of the straddle mount connector 32 include mating segments 106 having mating interfaces 108 at which the electrical contacts 62 engage the corresponding electrical contacts 56 (FIGS. 2, 15, and 16) of the receptacle connector 34 (FIGS. 1, 2, and 14-16). Engagement between the mating interfaces 108 of the electrical contacts 62 and the corresponding electrical contacts 56 establishes an electrical connection between the connectors 32 and 34. The mating segments 106 of the electrical contacts 62 are arranged in a row 110 that extends a length $L_2$ along the side 64 of the plug 52. The row 110 extends the length $L_2$ along a row axis 112. The electrical contacts 62 may be referred to herein as a "first group" and/or a "second group". The row 110 may be referred to herein as a "first row" and/or a "second row".

Figure 5:
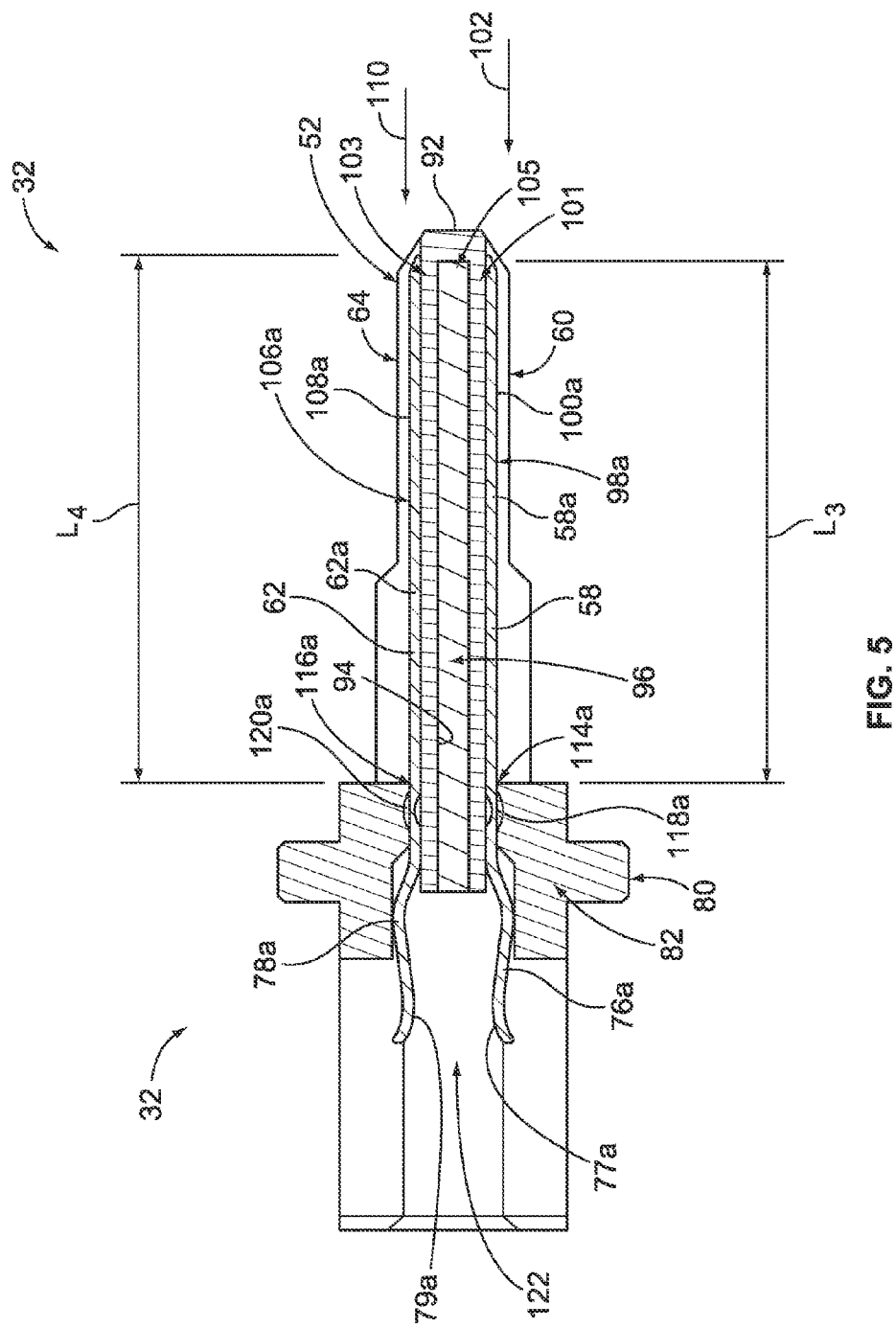
FIG. 5 is a cross-sectional view of the straddle mount connector shown in FIGS. 3 and 4.

FIG. 5 is a cross-sectional view of the straddle mount connector 32. FIG. 5 illustrates a signal contact 62a in the row 110 of electrical contacts 62 and a signal contact 58a in the row 102 of electrical contacts 58. The signal contacts 58a and 62a include respective contact bases 114a and 116a that are securely coupled to the base 82 of the connector body 80. In an exemplary embodiment, the contact bases 114a and 116a include one or more retention bosses 118a and 120a, respectively, that engage a portion of the base 82 to provide interference therewith to hold the contacts 58a and 62a in position with respect to the connector body 80. Additionally or alternatively, the contacts 58a and/or 62a may be securely coupled to the connector body 80 using any other structure, means, connection type, and/or the like, such as, but not limited to, using a snap-fit connection, using a latch, a threaded or other fastener, an adhesive, and/or the like.

Mating segments 98a and 106a of the signal contacts 58a and 62a, respectively, extend respective lengths $L_3$ and $L_4$ outwardly from the respective contact bases 114a and 116a along the sides 60 and 64, respectively, of the plug 52. Mating interfaces 100a and 108a of the mating segments 98a and 106a, respectively, are provided for mating with the respective electrical contacts 54 (FIGS. 2 and 14) and 56 (FIGS. 2, 15, and 16) of the receptacle connector 34 (FIGS. 1, 2, and 14-16). Each mating segment 98a and 106a may be referred to herein as a "signal mating segment".

Mounting segments 76a and 78a of the signal contacts 58a and 62a, respectively, extend outwardly from the respective contact bases 114a and 116a in opposite directions to the mating segments 98a and 106a. The mounting segments 76a and 78a include respective mounting interfaces 77a and 79a for engagement with the respective contact pads 66 and 68 (FIG. 3) on the sides 70 and 72, respectively, of the circuit board 26 (FIGS. 2 and 3). A space 122 is provided between the mounting segments 76a and 78a for receiving the edge 28 (FIGS. 2 and 3) of the circuit board 26. In other words, the mounting segments 76a and 78a of the signal contacts 58a and 62a, respectively, straddle the edge 28 of the circuit board 26 therebetween. Optionally, the mounting interfaces 77a and/or 79a are soldered to the respective contact pads 66 and 68. Other mounting means are possible in alternative embodiments. Optionally, and as can be seen in FIG. 5, the signal contacts 58a and 62a are arranged such that a signal contact 58a is aligned with a signal contact 62a on the opposite sides 60 and 64 of the plug 52.

As briefly described above, the plug 52 includes a plate cavity 94 that receives a ground plate 96 therein. The plate cavity 94 extends within the plug 52 between the sides 60 and 64. The plate cavity 94 extends through the plug 52 toward the end surface 92 of the plug 52. The plate cavity 94 optionally extends through the end surface 92. FIG. 5 illustrates the ground plate 96 received within the plate cavity 94. When installed within the plate cavity 94, the ground plate 96 extends between the rows 102 and 110 of the respective electrical contacts 58 and 62 along the lengths $L_1$ (FIG. 3) and $L_2$ (FIG. 4) of the respective rows 102 and 110. The ground plate 96 also extends between the rows 102 and 110 along the lengths $L_3$ and $L_4$ of the mating segments 98a and 106a of the signal contacts 58a and 62a, respectively. Optionally, and as can be seen in FIG. 5, the ground plate 96 extends between the rows 102 and 110 along an entirety of the lengths $L_3$ and $L_4$ of the mating segments 98a and 106a of the signal contacts 58a and 62a, respectively. When the ground plate 96 is installed within the plate cavity 94, the plug 52 has a layered structure that includes a bottom layer 101 of dielectric material, a middle layer 105 defined by the ground plate 96, and an upper layer 103 of dielectric material. The bottom layer 101 includes the side 60 of the plug 52, while the upper layer 103 includes the side 64 of the plug 52.

Figure 6:
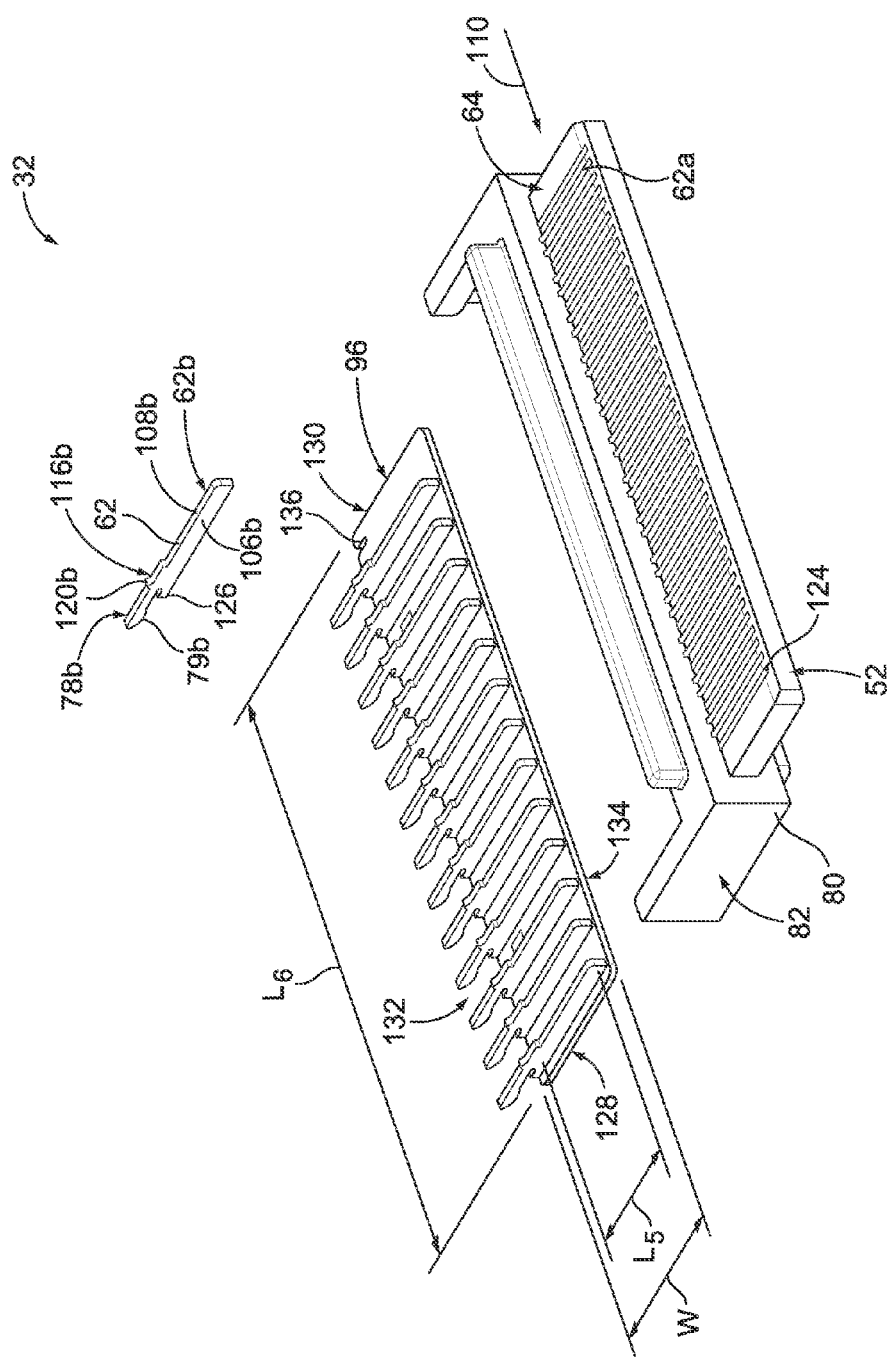
FIG. 6 is a partially exploded perspective view of the straddle mount connector shown in FIGS. 3-5.

FIG. 6 is a partially exploded view of the straddle mount connector 32 illustrating the ground plate 96 and the ground contacts 62b of the electrical contacts 62. FIG. 6 illustrates the signal contacts 62a in the row 110 of electrical contacts 62 as being arranged along the side 64 of the plug 52. However, the ground contacts 62b in the row 110 of electrical contacts 62 have been exploded from the side 64 of the plug 52 for clarity. Moreover, the ground plate 96 has been exploded out of the plug 52 for clarity.

The ground contacts 62b include contact bases 116b that are optionally securely coupled to the base 82 of the connector body 80. In an exemplary embodiment, the contact bases 116b include one or more retention bosses 120b, respectively, that engage a portion of the base 82 to provide interference therewith to hold the ground contacts 62b in position with respect to the connector body 80. Additionally or alternatively, the ground contacts 62b may be securely coupled to the connector body 80 using any other structure, means, connection type, and/or the like, such as, but not limited to, using a snap-fit connection, using a latch, a threaded or other fastener, an adhesive, and/or the like.

Mating segments 106b of the ground contacts 62b extend lengths $L_5$ outwardly from the contact bases 116b. As shown in FIG. 4, the mating segments 106b extend along the side 64 of the plug 52. Mating interfaces 108b of the mating segments 106b are provided for mating with the corresponding electrical contacts 56 (FIGS. 2, 15, and 16) of the receptacle connector 34 (FIGS. 1, 2, and 14-16). Each mating segment 106b may be referred to herein as a "ground mating segment".

The ground contacts 62b are optionally engaged with and electrically connected to the ground plate 96 such that the ground plate 96 and the ground contacts 62b are electrically common. For example, the mating segments 106b of the ground contacts 62b optionally extend through openings 124 that extend through the side 64 of the plug 52 and fluidly communicate with the plate cavity 94 (FIGS. 4 and 5). The openings 124 enable the mating segments 106b to engage, and thereby electrically connect to, the ground plate 96. Optionally, the contact bases 116b include retention tabs 126 for mounting the ground contacts 62b to the ground plate 96.

Mounting segments 78b of the ground contacts 62b extend outwardly from the contact bases 116b in opposite directions to the mating segments 106b. The mounting segments 78b include mounting interfaces 79b for engagement with the corresponding contact pads 68 (FIG. 3) on the side 72 (FIGS. 2 and 3) of the circuit board 26. Optionally, the mounting interfaces 79b are soldered to the corresponding contact pads 68. Other mounting means are possible in alternative embodiments.

The ground plate 96 extends a length $L_6$ from an end 128 to an opposite end 130. The ground plate 96 extends a width W from an end 132 to an opposite end 134. In an exemplary embodiment, and as can be seen in FIG. 6, the ground plate 96 is approximately planar. More specifically, the ground plate 96 has an approximately planar shape defined between the ends 128 and 130 and between the ends 132 and 134. The ground plate 96 optionally includes a plurality of slots 136 that receive the retention tabs 126 of the ground contacts 62b with an interference fit to mount the ground contacts 62b to the ground plate 96. Additionally or alternatively, other structures, means, connection types, and/or the like may be used to mount the ground contacts 62b to the ground plate 96, such as, but not limited to, using a snap-fit connection, using a latch, a threaded or other fastener, an adhesive, and/or the like.

Referring again to FIG. 4, the ground plate 96 is indicated with phantom lines. When installed within the plate cavity 94, the ground plate 96 extends between the rows 102 and 110 of the electrical contacts 58 and 62, respectively, along the lengths $L_1$ (FIG. 3) and $L_2$ of the respective rows 102 and 110. More specifically, the length $L_6$ (FIG. 6) of the ground plate 96 extends between the rows 102 and 110 of the electrical contacts 58 and 62, respectively, along the lengths $L_1$ and $L_2$ of the respective rows 102 and 110. Optionally, the length $L_6$ of the ground plate 96 extends between the rows 102 and 110 along an entirety of the lengths $L_1$ and $L_2$ of the respective rows 102 and 110.

The ground plate 96 also extends between the rows 102 and 110 of the electrical contacts 58 (FIGS. 3 and 5) and 62, respectively, along the lengths of the respective mating segments 98 and 106. More specifically, the width W of the ground plate 96 extends between the rows 102 and 110 of the electrical contacts 58 and 62, respectively, along the lengths $L_4$ and $L_5$ of the respective mating segments 106a and 106b of the signal and ground 62a and 62b, respectively, in the row 110. Optionally, the width W of the ground plate 96 extends between the rows 102 and 110 along an entirety of the lengths $L_4$ and $L_5$ of the respective mating segments 106a and 106b. The width W of the ground plate 96 also extends between the rows 102 and 110 of the electrical contacts 58 and 62, respectively, along the lengths $L_3$ of the mating segments 98 of the electrical contacts 58 in the row 110. Optionally, the width W of the ground plate 96 extends between the rows 102 and 110 along an entirety of the lengths $L_3$ of the mating segments 98.

Figure 7:
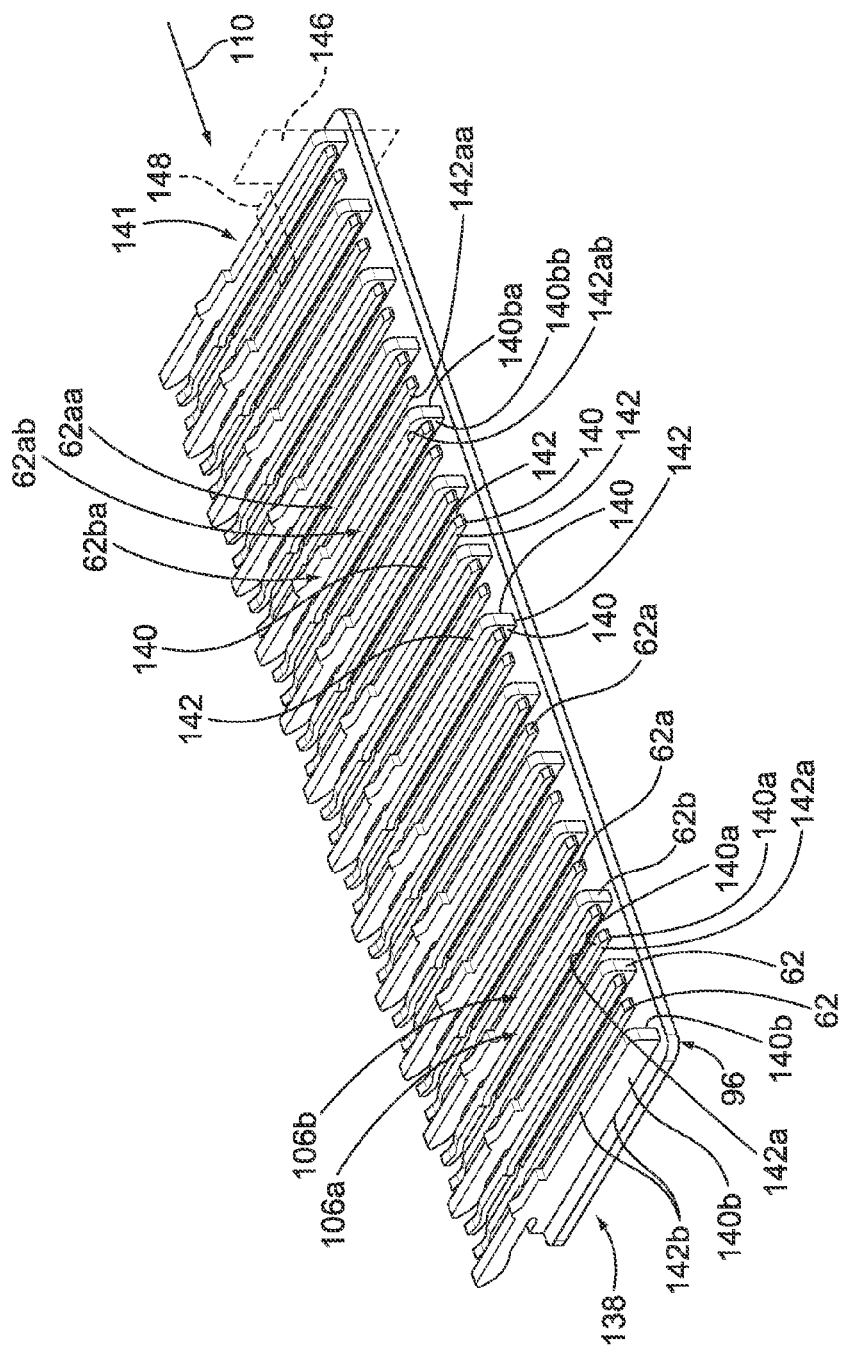
FIG. 7 is a perspective view illustrating an exemplary embodiment of a row of electrical contacts and an exemplary embodiment of a ground plate of the straddle mount connector shown in FIGS. 3-6.

FIG. 7 is a perspective view illustrating the row 110 of electrical contacts 62 and the ground plate 96. As can be seen in FIG. 7, the ground contacts 62b of the electrical contacts 62 are mounted to the ground plate 96 such that the ground contacts 62 are engaged with and electrically connected to the ground plate 96. Alternatively, one or more of the ground contacts 62b is not mounted to and/or is not engaged with the ground plate 96.

In an exemplary embodiment, the signal contacts 62a in the row 110 are arranged in differential pairs 62A. Alternatively, one or more of the signal contacts 62a in the row 110 is not arranged in a differential pair with any of the other signal contacts 62a in the row 110. Moreover, one or more of the signal contacts 62a in the row 110 may be arranged in a differential pair within a signal contact 58a (FIGS. 3 and 5) in the row 102 (FIGS. 4 and 5).

The ground contacts 62b are arranged between the differential pairs 62A of the signal contacts 62a. More specifically, the mating segments 106b of the ground contacts 62b are arranged in the row 110 between the mating segments 106a adjacent differential pairs 62A of the signal contacts 62a. The mating segments 106b of the ground contacts 62b provide electrical shielding between the mating segments 106a of adjacent signal contacts 62a. In an exemplary embodiment, and as shown in FIG. 7, the ground contacts 62b provide electrical shielding between adjacent differential pairs 62A of the signal contacts 62a. Optionally, the row 110 of electrical contacts 62 includes a ground contact 62b at an end 138 and/or at an opposite end 141 of the row 110. Although only a single ground contact 62b is shown as extending between adjacent differential pairs 62A, any number of ground contacts 62b may extend between adjacent differential pairs 62A.

The mating segments 106 of each of the electrical contacts 62 includes opposite broad-side surfaces 140 and opposite edge-side surfaces 142 that extend between the broad-side surfaces 140. More specifically, the mating segments 106a of the signal contacts 62a include broad-side surfaces 140a and edge-side surfaces 142a, while the mating segments 106b of the ground contacts 62b include broad-side surfaces 140b and edge-side surfaces 142b. As can be seen in FIG. 7, the broad-side surfaces 140a have a greater surface area than the edge-side surfaces 142a. Similarly, the broad-side surfaces 140b have a greater surface area than the edge-side surfaces 142b. The broad-side surfaces 140b of the ground contacts 62b have a greater surface area than the edge-side surfaces 142a of the signal contacts 62a. Within the differential pairs 62A, an edge side surface 142a of one of the signal contacts 62a within the differential pair 62A optionally faces an edge-side surface 142a of the other signal contact 62a within the differential pair 62A. For example, the edge-side surfaces 142a of signal contacts 62a within a differential pair 62A optionally extend approximately parallel to each other. The mating segments 106a of signal contacts 62a within a differential pair 62A may be positioned closer together than the mating segments of at least some known differential pairs of signal contacts.

For each ground contact 62b, the broad-side surfaces 140b of the mating segment 106b face corresponding edge-side surfaces 142a of the mating segments 106a of adjacent signal contacts 62a. For example, one of the broad-side surfaces 140ba of the mating segment 106b of a ground contact 62ba faces an edge-side surface 142aa of the mating segment 106a of an adjacent signal contact 62aa, while the other broad-side surface 140bb of the mating segment 106b of the ground contact 62ba faces an edge-side surface 142ab of the mating segment 106a of another adjacent signal contact 62ab. Optionally, an edge-side surfaces 142b of the ground contacts 62b extends coplanar with a broad-side surface 140a of the signal contacts 62a, as is indicated by the plane 148 shown within FIG. 7.

The mating segments 106b of the ground contacts 62b may provide a greater amount of shielding than at least some known ground contacts. Moreover, the mating segments 106b of the ground contacts 62b may enable adjacent signal contacts 62a (e.g., adjacent differential pairs 62A of signal contacts 62a) to be closer together while providing the same amount of shielding as compared to at least some known ground contacts.

In an exemplary embodiment, and as can be seen in FIG. 7, the broad-side surfaces 140b of the mating segments 106b of the ground contacts 62b extend approximately perpendicular to the broad-side surfaces 140a of the mating segments 106a of adjacent signal contacts 62a. For example, the broad-side surfaces 140b of the ground contacts 62b lie within planes 146 and the broad-side surfaces 140a of the signal contacts 62a lie within planes 148. The planes 146 are oriented approximately perpendicular to the planes 148. But, the broad-side surfaces 140b of the mating segments 106b of the ground contacts 62b may extend at any non-parallel angle relative to the broad-side surfaces 140a of the mating segments 106a of adjacent signal contacts 62a.

Referring again to FIG. 3, in an exemplary embodiment, the row 102 of the electrical contacts 58 does not include any ground contacts. Alternatively, the row 102 of electrical contacts 58 includes one or more ground contacts. For example, the row 102 of electrical contacts 58 may include one or more ground contacts having a mating segment that has the shape and/or orientation of the mating segments 98a of the signal contacts 58a (FIGS. 3 and 5). Another example includes providing the row 102 of electrical contacts 58 with one or more ground contacts having a mating segment that has the shape and/or orientation of the mating segments 106b (FIGS. 4, 6, and 7) of the ground contacts 62b (FIGS. 3, 4, 6, and 7).

In some embodiments wherein the row 102 of electrical contacts 58 includes at least one ground contact, one or more of the ground contacts in the row 102 may be electrically connected to one or more of the ground contacts 62b in the row 110 to electrically common the electrically connected ground contacts together. For example, a ground contact in the row 102 may be engaged with a ground contact 62b in the row 110. Moreover, and for example, a ground contact in the row 102 may be electrically connected to a ground contact 62b in the row 110 via the ground plate 96 (e.g., both ground contacts engage the ground plate 96).

Figure 8:
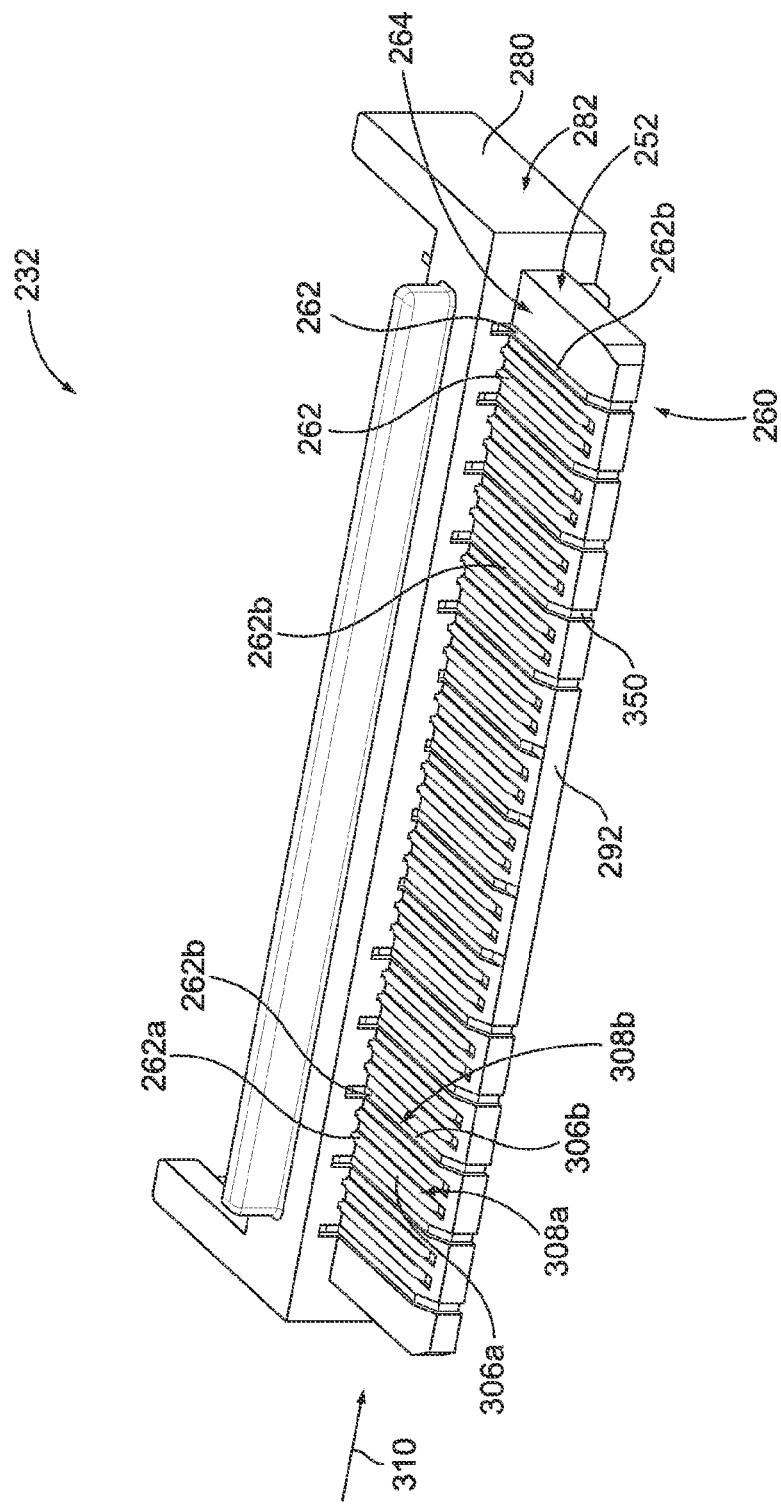
FIG. 8 is a perspective view of another exemplary embodiment of a straddle mount connector.
Figure 9:
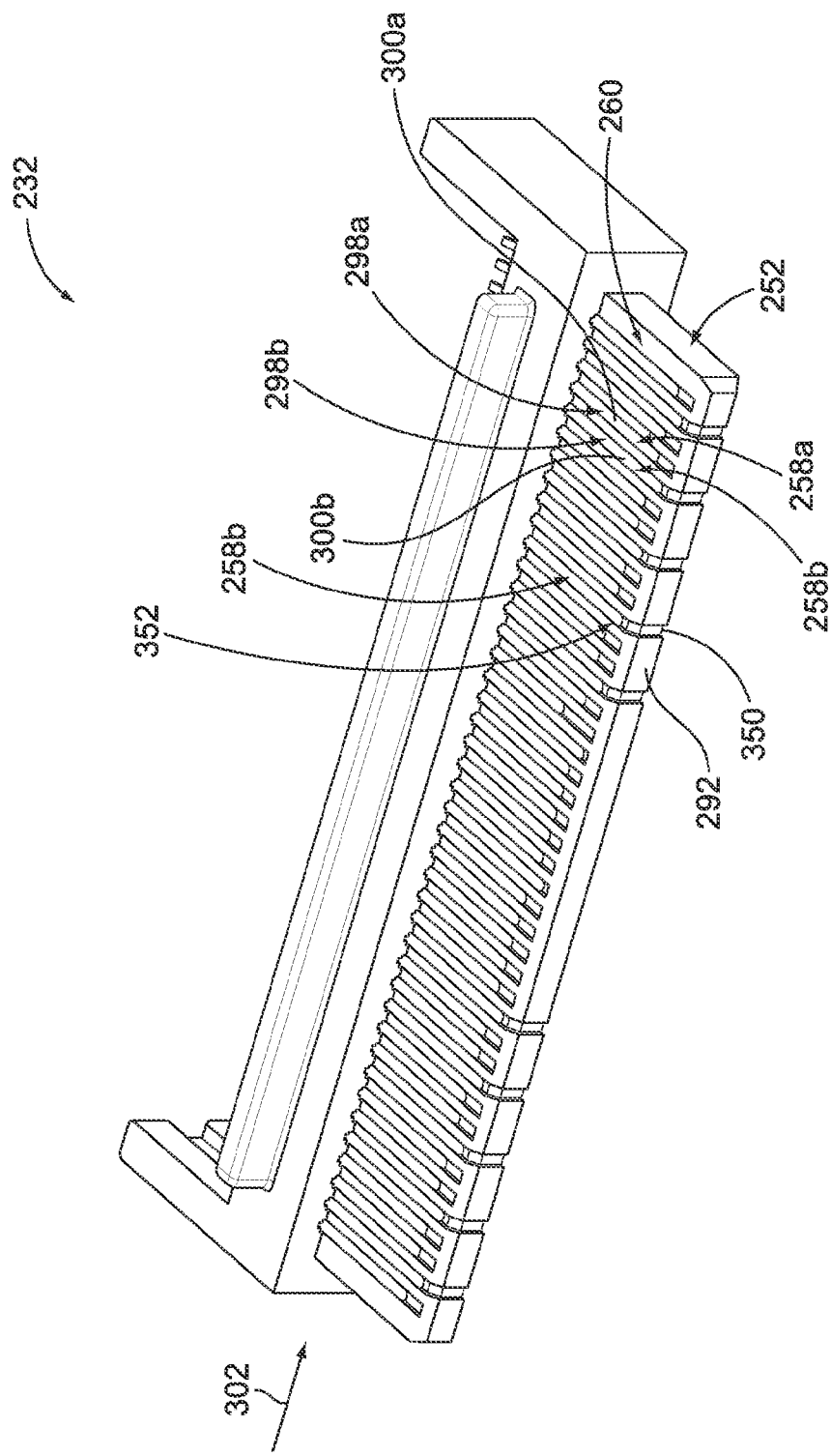
FIG. 9 is another perspective view of the straddle mount connector shown in FIG. 8 viewed from a different angle than FIG. 8.

FIG. 8 is a perspective view of another exemplary embodiment of a straddle mount connector 232. The straddle mount connector 232 includes ground contacts 262b arranged in a row 310 that are engaged with corresponding ground contacts 258b (FIG. 9) arranged in a different row 302 (FIG. 9). The straddle mount connector 232 is configured to be mounted to the edge 28 (FIGS. 2 and 3) of the circuit board 26 (FIGS. 2 and 3) in a substantially similar manner to the straddle mount connector 32 (FIGS. 2-6).

The straddle mount connector 232 includes a dielectric connector body 280 having a base 282 and a plug 252, which extends outwardly from the base 282. The plug 252 is configured to be received within the receptacle 50 (FIGS. 2 and 14) of the receptacle connector 34 (FIGS. 1, 2, and 14-16). The plug 252 includes opposite sides 260 and 264. FIG. 8 illustrates the side 264 of the plug 252. Optionally, the plug 252 includes a plate cavity (not shown) that receives an optional ground plate 296 (FIGS. 10 and 11) therein. Each side 260 and 264 of the plug 252 may be referred to herein as a "first side" and/or a "second side".

The connector body 280 holds a plurality of electrical contacts 258 (FIG. 9) and a plurality of electrical contacts 262. The electrical contacts 262 include signal contacts 262a and ground contacts 262b. The signal contacts 262a are configured to conduct electrical data signals, while the ground contacts 262b are configured to be electrically connected to a ground. Optionally, the electrical contacts 262 include one or more power contacts that are configured to conduct electrical power. The signal and ground contacts 262a and 262b include respective mating segments 306a and 306b having respective mating interfaces 308a and 308b at which the electrical contacts 262 engage corresponding electrical contacts 56 (FIGS. 2, 15, and 16) of the receptacle connector 34. The mating segments 306a and 306b of the signal and ground contacts 262a and 262b, respectively, are arranged in the row 310, which extends a length along the side 264 of the plug 252. The electrical contacts 262 may be referred to herein as a "first group" and/or a "second group". The row 310 may be referred to herein as a "first row" and/or a "second row". Each of the signal contacts 262a may be referred to herein as a "first" and/or a "second" signal contact. Each mating segment 306a may be referred to herein as a "signal mating segment". Each mating segment 306b may be referred to herein as a "ground mating segment".

FIG. 9 is another perspective view of the straddle mount connector 232 viewed from a different angle than FIG. 8. FIG. 9 illustrates the side 260 of the plug 252. The electrical contacts 258 include signal contacts 258a and ground contacts 258b. The signal contacts 258a are configured to conduct electrical data signals, while the ground contacts 258b are configured to be electrically connected to a ground. Optionally, the electrical contacts 258 include one or more power contacts that are configured to conduct electrical power. Each of the signal contacts 258a may be referred to herein as a "first" and/or a "second" signal contact.

The signal and ground contacts 258a and 258b include respective mating segments 298a and 298b having respective mating interfaces 300a and 300b at which the electrical contacts 262 engage corresponding electrical contacts 54 (FIGS. 2 and 14) of the receptacle connector 34. The mating segments 298a and 298b of the signal and ground contacts 258a and 258b, respectively, are arranged in the row 302, which extends a length along the side 260 of the plug 252. The electrical contacts 258 may be referred to herein as a "first group" and/or a "second group". The row 302 may be referred to herein as a "first row" and/or a "second row". Each mating segment 298a may be referred to herein as a "signal mating segment". Each mating segment 298b may be referred to herein as a "ground mating segment".

As can be seen in FIG. 9, at least one of the ground contacts 262b in the row 310 include a commoning segment 350 that extends along the side 260 of the plug 252. The commoning segment 350 engages a corresponding one of the ground contacts 258b in the row 302 to electrically connect the ground contact 262b in the row 310 to the corresponding ground contact 258b in the row 302. Referring again to FIG. 8, the commoning segment 350 extends outwardly from the mating segment 306b of the corresponding ground contact 262b along the side 264 of the plug 252. As should be apparent when considering FIGS. 8 and 9 together, the commoning segment 350 extends from the side 264 of the plug 252 to the side 260 of the plug 252. Referring again to FIG. 9, the commoning segment 350 extends along the side 260 of the plug 252 into engagement with a contact tip 352 of the mating segment 298b of the corresponding ground contact 258b in the row 302.

In an exemplary embodiment, the commoning segment 350 extends through the plug 252. More specifically, the commoning segment 350 extends from the side 264 of the plug 252, through the plug 252, to the side 260 of the plug 252. Alternatively, the commoning segment 350 extends from the side 264 of the plug, over an end surface 292 of the plug 252, to the side 260. Although only some of the ground contacts 262b are shown as including the commoning segment, alternatively all of the ground contacts 262b in the row 310 include a commoning segment 350.

Figure 10:
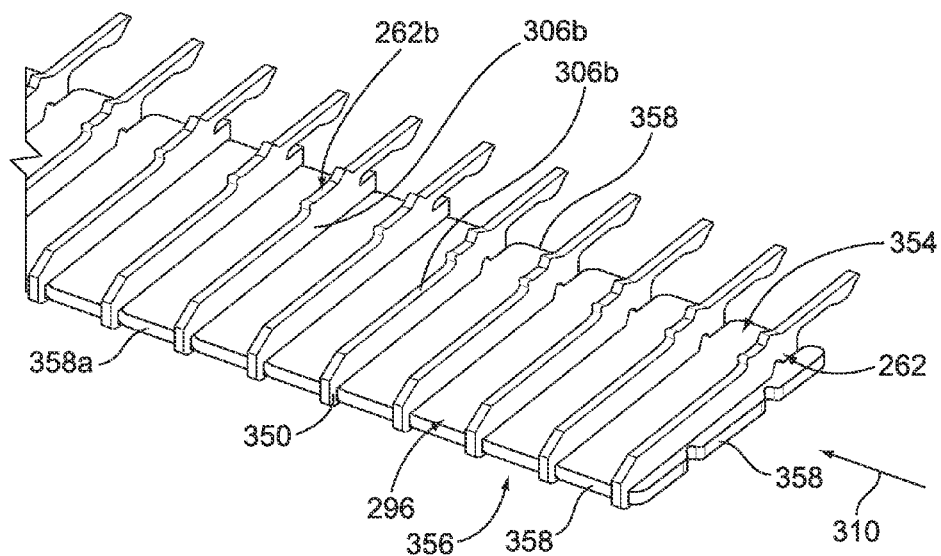
FIG. 10 is a perspective view illustrating a portion of an exemplary embodiment of a row of electrical contacts and a portion of an exemplary embodiment of a ground plate.

The straddle mount connector 232 optionally includes a ground plate 296 (FIGS. 10 and 11) held within the plug 252 such that the ground plate 296 extends between the rows 302 and 310 of the respective electrical contacts 258 and 262. FIG. 10 is a perspective view illustrating a portion of the row 310 of electrical contacts 262 and a portion of the ground plate 296. The signal contacts 262a in the row 310 have been removed for clarity. The ground plate 296 includes opposite sides 354 and 356 and edges 358 that extend from the side 354 to the side 356. When the ground plate 296 is held within the plug 252, the side 354 of the ground plate 296 faces the side 264 of the plug, while the side 356 faces the side 260 of the plug 252.

Figure 11:
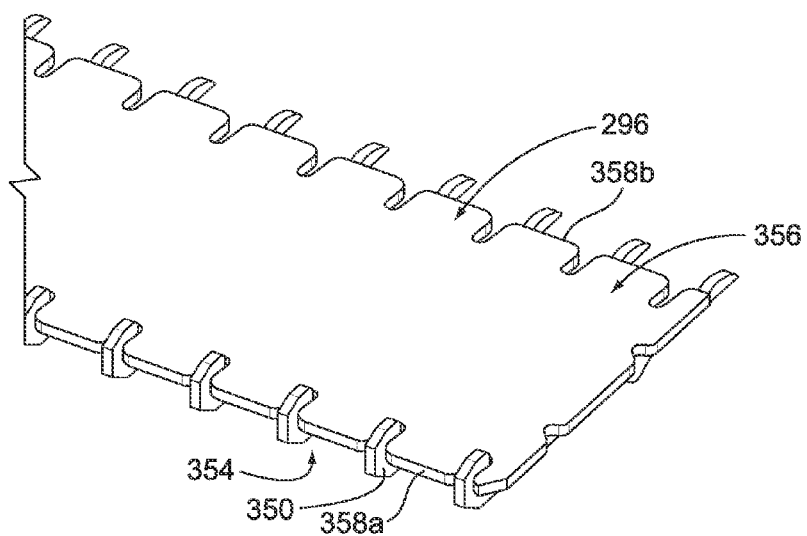
FIG. 11 is a perspective view illustrating a side of the ground plate shown in FIG. 10.

The ground contacts 262b in the row 310 are mounted to the ground plate 296 such that the mating segments 106b extend along the side 354 of the ground plate 296. The commoning segments 350 extend outwardly from the corresponding mating segment 106b along the side 354 of the ground plate 296. The commoning segments 350 extend over an edge 358a of the ground plate 296 to the side 356 of the ground plate 296. FIG. 11 is another perspective view illustrating the side 356 of the ground plate 296. The commoning segments 350 extend from the side 354 of the ground plate 296, over the edge 358a, to the side 356. As can be seen in FIG. 11, the commoning segments 350 extend along the side 356 of the ground plate 296 toward an edge 358b of the ground plate 296 for engagement with the contact tip 352 (FIG. 9) of the corresponding ground contact 258b (FIG. 9) in the row 302 (FIG. 9).

Figure 12:
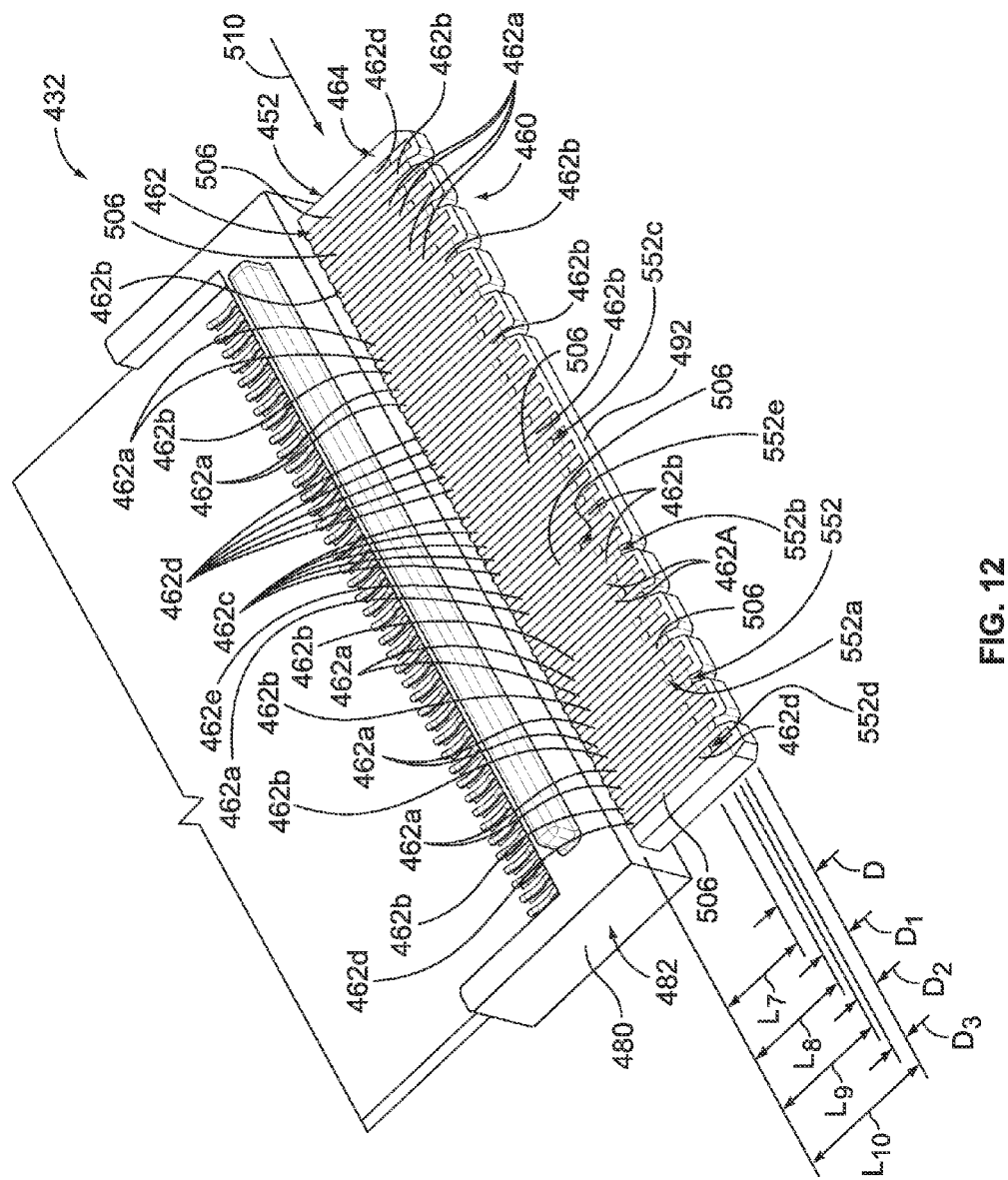
FIG. 12 is a perspective view of another exemplary embodiment of a straddle mount connector.

FIG. 12 is a perspective view of another exemplary embodiment of a straddle mount connector 432. The straddle mount connector 432 includes a row 510 of electrical contacts 462 having a mating sequence. In other words, some of the electrical contacts 462 in the row 510 mate with corresponding electrical contacts 56 (FIGS. 2, 15, and 16) of the receptacle connector 34 (FIGS. 1, 2, and 14-16) before other electrical contacts 462 in the row 510. The straddle mount connector 432 is configured to be mounted to the edge 28 (FIGS. 2 and 3) of the circuit board 26 (FIGS. 2 and 3) in a substantially similar manner to the straddle mount connectors 32 (FIGS. 2-6) and 232 (FIGS. 8 and 9). The electrical contacts 462 may be referred to herein as a "first group" and/or a "second group".

The straddle mount connector 432 includes a dielectric connector body 480 having a base 482 and a plug 452, which extends outwardly from the base 482. The plug 452 is configured to be received within the receptacle 50 (FIGS. 2 and 14) of the receptacle connector 34. The plug 452 includes opposite sides 460 and 464 and extends a length outwardly from the base 482 to an end surface 492 of the plug 452. Optionally, the plug 452 includes a plate cavity (not shown) that receives an optional ground plate (now shown) therein. Each side 460 and 464 of the plug 452 may be referred to herein as a "first side" and/or a "second side".

The connector body 480 holds a plurality of electrical contacts 462. The electrical contacts 462 include respective mating segments 506 having mating interfaces 508 at which the electrical contacts 462 engage corresponding electrical contacts 56 of the receptacle connector 34. The mating segments 506 of the electrical contacts 462 are arranged in the row 510, which extends a length along the side 464 of the plug 452. The row 510 may be referred to herein as a "first row" and/or a "second row". Each mating segment 506 may be referred to herein as a "signal mating segment" and/or a "ground mating segment".

The connector body 480 optionally holds a plurality of electrical contacts (not shown) that include mating segments (not shown) arranged in a row (not shown) on the side 460 of the plug 452. Such a row of electrical contacts having mating segments arranged on the side 460 of the plug 452 would include mating interfaces (not shown) at which the electrical contacts engage corresponding electrical contacts 54 (FIGS. 2 and 14) of the receptacle connector 34. Each of the electrical contacts on the side 460 of the plug 452 may be referred to herein as a "first" and/or a "second" signal contact.

The electrical contacts 462 include signal contacts 462a and ground contacts 462b. The electrical contacts 462 optionally include power contacts 462c, miscellaneous signal contacts 462d, and/or one or more detection contacts 462e. The signal contacts 462a are configured to conduct electrical data signals and are arranged in differential pairs 462A. The ground contacts 462b are configured to be electrically connected to a ground. The power contacts 462c are configured to conduct electrical power. The miscellaneous signal contacts 462d are configured to conduct electrical data signals and are not arranged in differential pairs. The detection contact 462e is configured to detect a predetermined event, such as, but not limited to, whether all of the other electrical contacts 462 in the row 510 have mated with the corresponding electrical contacts 56 of the receptacle connector 34. The straddle mount connector 432 may have any number of each of the electrical contacts 462a, 462b, 462c, 462d, and 462e. Each of the signal contacts 462a may be referred to herein as a "first" and/or a "second" signal contact.

The mating segments 506 of the electrical contacts 462 extend lengths along the side 464 of the plug 452 from the base 482 to contact tips 552 of the mating segments 506. At least one of the electrical contacts 462 has a contact tip 552 that is positioned closer to the end surface 492 of the plug 452 than the contact tip 552 of at least one other electrical contact 462. Accordingly, as the plug 452 is inserted into the receptacle 50 (FIGS. 2 and 14) of the receptacle connector 34, the mating segment 506 of the electrical contact 462 having the contact tip 552 that is closer to the end surface 492 will mate with the corresponding electrical contact 56 of the receptacle connector 34 before the mating segment 506 of the electrical contact 462 having the contact tip 552 that farther from the end surface 492 mates with the corresponding electrical contact 56.

In an exemplary embodiment, a mating segment 506 of the detection contact 462e extends a length $L_7$ along the side 464 from the base 482 to a contact tip 552e of the detection contact 462e. The contact tip 552e of the detection contact 462e is thus located a distance D from the end surface 492 of the plug 452. Mating segments 506 of the signal contacts 462a extend lengths $L_8$ along the side 464 from the base 482 to contact tips 552 of the signal contacts 462a. Mating segments 506 of the miscellaneous signal contacts 462d also extend lengths $L_8$ along the side 464 from the base 482 to contact tips 552 of the miscellaneous signal contacts 462d. Accordingly, the contact tips 552 of the signal contacts 462a and the miscellaneous signal contacts 462d, respectively, are thus located a distance $D_1$ from the end surface 492 of the plug 452. Mating segments 506 of the power contacts 462c extend lengths $L_9$ along the side 464 from the base 482 to contact tips 552 of the power contacts 462c. The contact tips 552 of the power contacts 462c are thus located a distance $D_2$ from the end surface 492 of the plug 452. Mating segments 506 of the ground contacts 462b extend lengths $L_{10}$ along the side 464 from the base 482 to contact tips 552 of the ground contacts 462a. Accordingly, the contact tips 552 of the ground contacts 462b are located a distance $D_3$ from the end surface 492 of the plug 452.

As can be seen in FIG. 12, in an exemplary embodiment the length $L_{10}$ is greater than the length $L_9$, the length $L_9$ is greater than the length $L_8$, and the length $L_8$ is greater than the length $L_7$. Accordingly, the distance D is greater than the distance $D_1$, the distance $D_1$ is greater than the distance $D_2$, and the distance $D_2$ is greater than the distance $D_3$. The contact tips 552b of the ground contacts 462b are thus positioned closer to the end surface 492 of the plug 452 than the contact tips 552c of the power contacts 462c. The contact tips 552c of the power contacts 462c are positioned closer to the end surface 492 of the plug 452 than the contact tips 552a and 552d of the signal contacts 462a and the miscellaneous signal contacts 462d, respectively. The contact tips 552a and 552d of the signal contacts 462a and the miscellaneous signal contacts 462d, respectively, are positioned closer to the end surface 492 of the plug 452 than the contact tip 552e of the detection contact 462e.

Accordingly, when the plug 452 is inserted into the receptacle 50 of the receptacle connector 34, the ground contacts 462b will mate with the corresponding contacts 56 of the receptacle connector 34 first. Next, the power contacts 462c will mate with the corresponding contacts 56 of the receptacle connector 34. Thereafter, the signal contacts 462a and the miscellaneous signal contacts 462d will mate with the corresponding contacts 56. The detection contact 462e will be the last electrical contact 462 to mate with the corresponding contact 56 of the receptacle connector 34. In other words, a mating sequence of the electrical contacts 462 with the corresponding electrical contacts 56 of the receptacle connector 34 begins with the ground contacts 462b, follows with the power contacts 462c and thereafter the signal contacts 462a and the miscellaneous signal contacts 462d, and ends with the detection contact 462e.

In an exemplary embodiment, the mating sequence of the electrical contacts 462 with the corresponding electrical contacts 56 includes four stages. Namely, the first stage of the mating sequence is the ground contacts 462b, the second stage is the power contacts 462c, the third stage is the signal contacts 462a and the miscellaneous signal contacts 462d, and the fourth stage is the detection contact 462e. But, the mating sequence of the electrical contacts 462 may include any other number of stages. Moreover, the mating sequence is not limited to the order of the electrical contacts 462a, 462b, 462c, 462d, and 462e described and illustrated herein. Rather, the mating sequence may include any other order of mating of the electrical contacts 462a, 462b, 462c, 462d, and 462e. Providing the straddle mount connector 432 with a mating sequence may enable the receptacle connector 34 to be more easily manufactured and/or to be manufactured at less cost, for example because the connector body 48 of the receptacle connector 34 may not need to be reconfigured to provide any electrical contacts of the receptacle connector 34 with different lengths and/or positions relative to each other.

Figure 13:
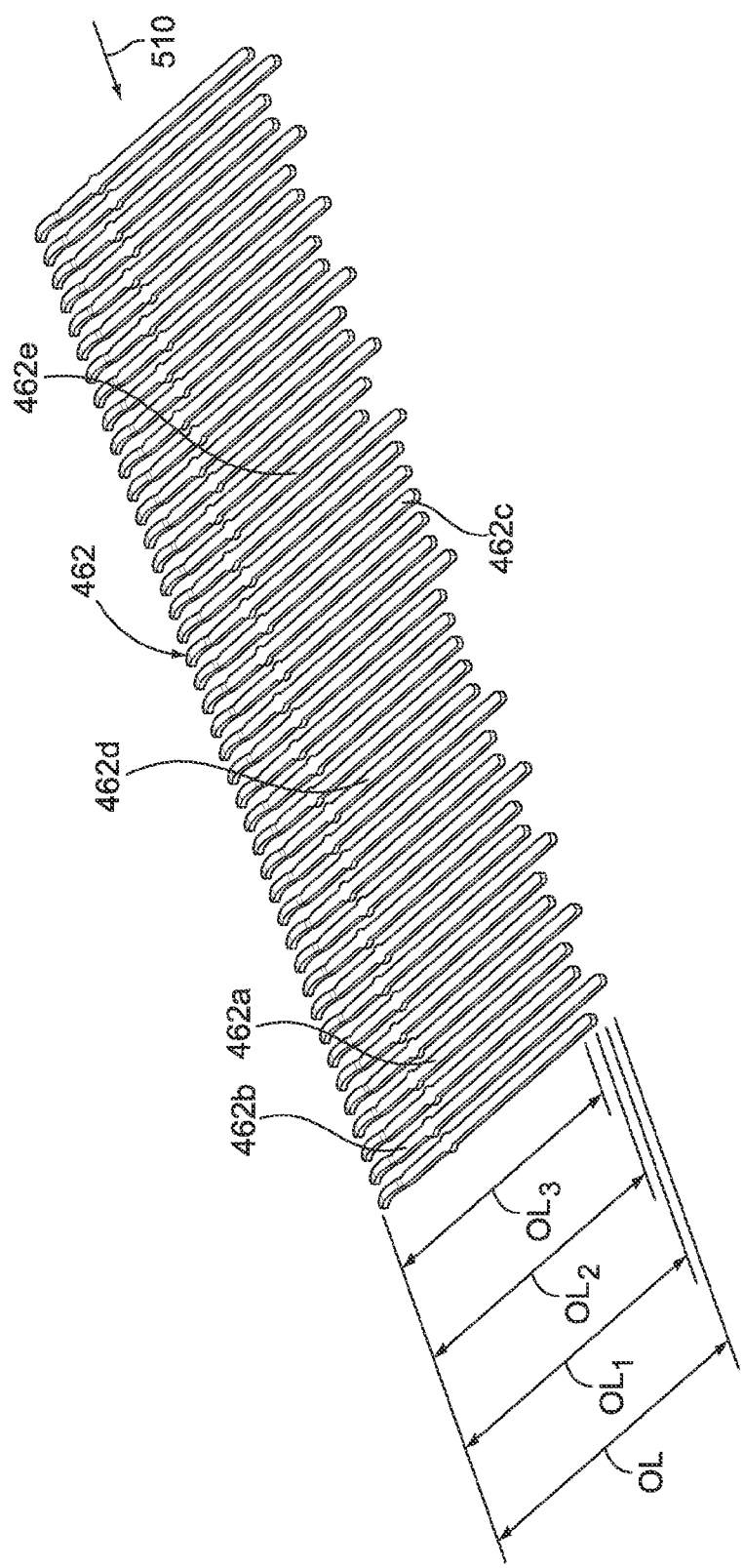
FIG. 13 is a perspective view illustrating an exemplary embodiment of a row of electrical contacts of the straddle mount connector shown in FIG. 12.

FIG. 13 is a perspective view illustrating the row 510 of the electrical contacts 462. In an exemplary embodiment, and as can be seen in FIG. 13, the different lengths $L_7$, $L_8$, $L_9$, and $L_{10}$ (FIG. 12) are provided by giving the electrical contacts 462 different overall lengths. For example, each of the ground contacts 462b has an overall length OL that is greater than an overall length $OL_1$ of each of the power contacts 462c. Similarly, the overall length $OL_1$ of each of the power contacts 462c is greater than an overall length $OL_2$ of each of the signal contacts 462a and each of the miscellaneous signal contacts 462d. Finally, the overall length $OL_2$ of each of the contacts 462a and 462d is greater than an overall length $OL_3$ of the detection contact 462e. However, in some alternative embodiments the position of one or more of the electrical contacts 462 is shifted along the length of the plug 452 (FIG. 12) relative to one or more other electrical contacts 462 to provide the different lengths $L_7$, $L_8$, $L_9$, and/or $L_{10}$.

Figure 14:
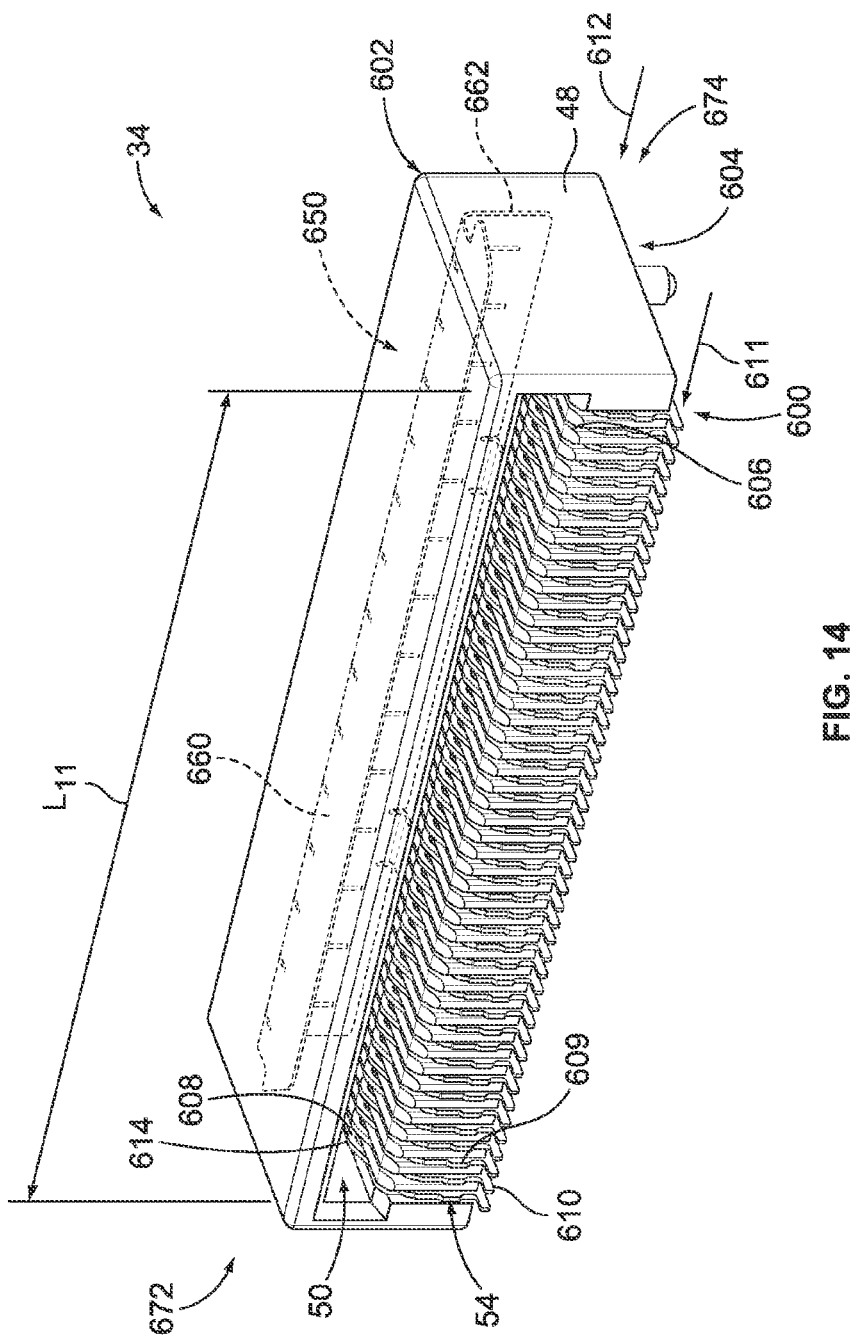
FIG. 14 is a perspective view of an exemplary embodiment of a receptacle connector of the transceiver assembly shown in FIG. 1.

FIG. 14 is a perspective view of an exemplary embodiment of the receptacle connector 34. The receptacle connector 34 includes the connector body 48, which extends from a front end 600 to a rear end 602 and includes a bottom side 604. The connector body 48 is configured to be mounted on the host circuit board 16 (FIGS. 1 and 2) at the bottom side 604. The front end 600 of the connector body 48 includes the receptacle 50. More particularly, the receptacle 50 extends through the front end 600 and into the connector body 48 toward the rear end 602.

The electrical contacts 54 of the receptacle connector 34 are held by the connector body 48. Optionally, the connector body 48 includes a plurality of grooves 606 that receive corresponding electrical contacts 54 therein. The grooves 606 may facilitate holding the electrical contacts 54 in position relative to one another (e.g. side-to-side position). The electrical contacts 54 include mating segments 608 and mounting segments 609, which include mounting feet 610. The mounting segments 609 of the electrical contacts 54 are arranged in a row 611 that extends along the front end 600 of the connector body 48. The mating segments 608 of the electrical contacts 54 are arranged within a row 612 and extend within the receptacle 50. The mating segments 608 include mating interfaces 614 that are exposed within the receptacle 50. The mating interfaces 614 of the electrical contacts 54 are configured to engage corresponding ones of the electrical contact 58 (FIGS. 3 and 5) of straddle mount connector 32 (FIGS. 2-6).

As can be seen in FIG. 14, the mounting feet 610 of the electrical contacts 54 extend along the front end 600 of the connector body 48. In an exemplary embodiment, the mounting foot 610 of each electrical contact 54 is configured to be surface mounted to the host circuit board 16. More particularly, the mounting feet 610 are mounted on corresponding terminations (not shown) on the host circuit board 16 in electrical and/or optical connection therewith. In some alternative embodiments, one or more of the electrical contacts 54 is mounted on the host circuit board 16 using another type of mounting than surface mounting, such as, but not limited to, using a compliant pin (instead of the mounting foot 610) that is received within a via (not shown) of the host circuit board 16.

The receptacle connector 34 may include any number of the electrical contacts 54. Each of the electrical contacts 54 may be a signal contact, a ground contact, or a power contact. Optionally, some or all electrical contacts 54 used as signal contacts may be arranged in pairs with each signal contact within a pair conveying a differential signal, thus defining one or more differential pairs. Within the arrangement of the electrical contacts 54, one or more ground contacts may be provided between adjacent differential pairs of signal contacts. Any other contact arrangement of the electrical contacts 54 may be provided.

The connector body 48 of the receptacle connector 34 also holds the electrical contacts 56 (FIGS. 15 and 16), which mate with corresponding electrical contacts 62 (FIGS. 3-7) of the straddle mount connector 32. The connector body 48 includes a plurality of optional grooves (not shown) that receive corresponding electrical contacts 56 therein. Similar to the grooves 606, the grooves may facilitate holding the electrical contacts 56 in position relative to one another (e.g. side-to-side position).

Optionally, some or all of the electrical contacts 56 of the receptacle connector 34 convey data signals at a higher rate than some or all of the electrical contacts 54 of the receptacle connector 34. For example, in some embodiments, signal contacts 56a (FIGS. 15 and 16) of the electrical contacts 56 convey data signals at a data rate of at least 10 Gbps, while the electrical contacts 54 convey data signals at less than 10 Gbps. Moreover, and for example, in some embodiments the signal contacts 56a convey data signals at a data transmission rate of at least 28 Gbps, while the electrical contacts 54 convey data signals at less than 28 Gbps. Moreover, and for example, in some embodiments the signal contacts 56a convey data signals at a data transmission rate of between approximately 20 Gbps and approximately 30 Gbps, while the electrical contacts 54 convey data signals at less than 20 Gbps. In other embodiments, some or all of the electrical contacts 56 of the receptacle connector 34 convey data signals at approximately the same or a lesser rate than some or all of the electrical contacts 54 of the receptacle connector 34. For the purposes of comparison with the data rate of any of the signal contacts 56a, any electrical contact 54 that conveys electrical power or electrical ground will be considered to convey data signals at a rate of approximately 0 Gbps. The signal contacts 56a may be referred to herein as "signal mating contacts".

Figure 15:
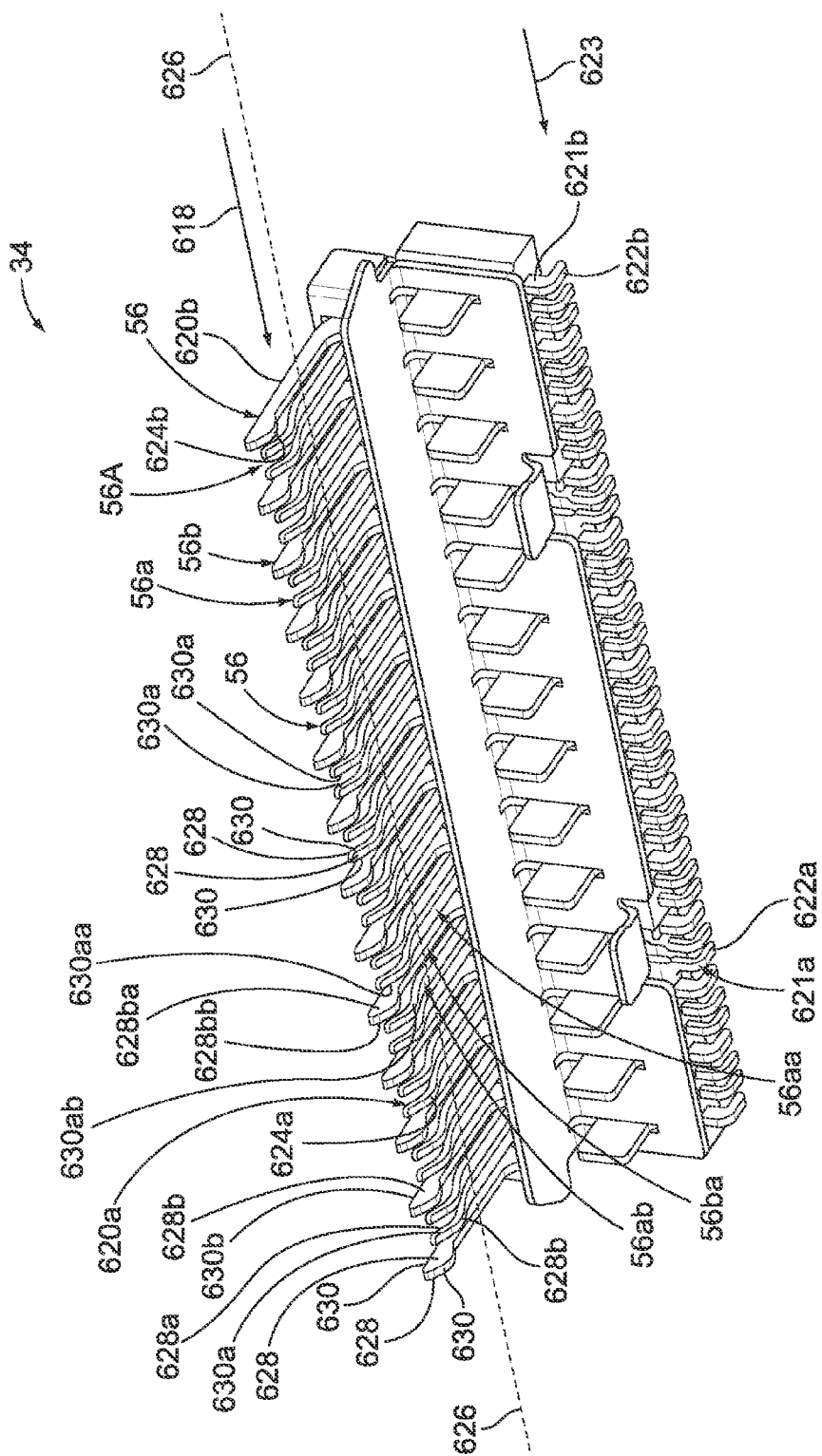
FIG. 15 is a perspective view of a portion of the receptacle connector shown in FIG. 14 illustrating an exemplary embodiment of a row of electrical contacts.

FIG. 15 is a perspective view of a portion of the receptacle connector 34 illustrating a row 618 of the electrical contacts 56. The connector body 48 (FIGS. 2 and 14) and the electrical contacts 54 (FIGS. 2 and 14) of the receptacle connector 34 have been removed from FIG. 15 for clarity. The electrical contacts 56 include the signal contacts 56a and ground contacts 56b. The signal contacts 56a are configured to conduct electrical data signals, while the ground contacts 56b are configured to be electrically connected to a ground. Optionally, the row 618 of the electrical contacts 56 includes one or more power contacts that are configured to conduct electrical power. The ground contacts 56b may be referred to herein as "ground mating contacts".

In an exemplary embodiment, the signal contacts 56a are arranged in differential pairs 56A. Alternatively, some or all of the signal contacts 56a are not arranged in differential pairs. The signal contacts 56a include mating segments 620a and mounting segments 621a. The mounting segments 621 include mounting feet 622a. As should be apparent from a comparison of FIGS. 14 and 15, the mating segments 620a of the signal contacts 56a extend within the receptacle 50 (FIGS. 2 and 14) of the receptacle connector 34. The mating segments 620a of the signal contacts 56a include mating interfaces 624a that are exposed within the receptacle 50 and engage corresponding ones of the signal contacts 62a (FIGS. 3-5 and 7) of the straddle mount connector 32 (FIGS. 2-6).

The ground contacts 56b also include mating segments 620b and mounting segments 621b, which include mounting feet 622b. The mating segments 620b of the ground contacts 56b extend within the receptacle 50 and include mating interfaces 624b that are exposed within the receptacle 50 and engage corresponding ones of the ground contacts 62b (FIGS. 3-7) of the straddle mount connector 32. The receptacle connector 34 may include any number of the electrical contacts 56, including any number of signal contacts 56a, any number of ground contacts 56b, and any number of differential pairs 56A. As can be seen in FIG. 2, the mounting feet 622 of the signal and ground contacts 56a and 56b, respectively, extend along the rear end 602 of the connector body 48 of the receptacle connector 34.

In an exemplary embodiment, the mounting feet 622 of the electrical contacts 56 are each configured to be surface mounted to the host circuit board 16. More particularly, the mounting feet 622 are mounted on corresponding terminations (not shown) on the host circuit board 16 in electrical and/or optical connection therewith. In some alternative embodiments, one or more of the electrical contacts 56 is mounted on the host circuit board 16 using another type of mounting than surface mounting, such as, but not limited to, using a compliant pin (instead of the mounting foot 622) that is received within a via (not shown) of the host circuit board 16.

The mating segments 620a and 620b of the signal and ground contacts 56a and 56b, respectively, are arranged side-by-side within the row 618, which extends a length along a row axis 626. As should be apparent from a comparison of FIGS. 14 and 15, the row 618 of the mating segments 620a and 620b of the electrical contacts 56 opposes the row 612 (FIG. 14) of the mating segments 608 (FIG. 14) of the electrical contacts 54 (FIG. 14). The mating interfaces 624 of the electrical contacts 56 oppose the mating interfaces 614 (FIG. 14) of the electrical contacts 54 within the receptacle 50. The mounting segments 621a and 621b are arranged in a row 623 that extends along the rear end 602 of the connector body 48.

As can be seen in FIG. 15, within the row 618 of the mating segments 620, a single ground contact 56b is provided between adjacent differential pairs 56A of the signal contacts 56a. The mating segment 620b of the ground contact 56b extends within the row 618 between the mating segments 620a of the signal contacts 56a of the two adjacent differential pairs 56A. Alternatively, two or more ground contacts 56b extend between adjacent differential pairs 56A within the row 618.

The mating segments 620 of each of the electrical contacts 56 includes opposite broad-side surfaces 628 and opposite edge-side surfaces 630 that extend between the broad-side surfaces 628. More specifically, the mating segments 620a of the signal contacts 56a include broad-side surfaces 628a and edge-side surfaces 630a, while the mating segments 620b of the ground contacts 56b include broad-side surfaces 628b and edge-side surfaces 630b. As can be seen in FIG. 15, the broad-side surfaces 628a have a greater surface area than the edge-side surfaces 630a. Similarly, the broad-side surfaces 628b have a greater surface area than the edge-side surfaces 630b. The broad-side surfaces 628b of the ground contacts 56b have a greater surface area than the edge-side surfaces 630a of the signal contacts 56a. Within the differential pairs 56A, an edge side surface 630a of one of the signal contacts 56a within the differential pair 56A optionally faces an edge-side surface 630a of the other signal contact 56a within the differential pair 56A. For example, the edge-side surfaces 630a of signal contacts 56a within a differential pair 56A optionally extend approximately parallel to each other. The mating segments 620a of signal contacts 56a within a differential pair 56A may be positioned closer together than the mating segments of at least some known differential pairs of signal contacts.

For each ground contact 56b, the broad-side surfaces 628b of the mating segment 620b face corresponding edge-side surfaces 630a of the mating segments 620a of adjacent signal contacts 56a. For example, one of the broad-side surfaces 628ba of the mating segment 620b of a ground contact 56ba faces an edge-side surface 630aa of the mating segment 620a of an adjacent signal contact 56aa, while the other broad-side surface 628bb of the mating segment 620b of the ground contact 56ba faces an edge-side surface 630ab of the mating segment 620a of another adjacent signal contact 56ab. Optionally, an edge-side surface 630b of the ground contacts 56b extends coplanar with a broad-side surface 628a of the signal contacts 56a.

The mating segments 620b of the ground contacts 56b may provide a greater amount of shielding than at least some known ground contacts. Moreover, the mating segments 620b of the ground contacts 56b may enable adjacent signal contacts 56a (e.g., adjacent differential pairs 56A of signal contacts 56a) to be closer together while providing the same amount of shielding as compared to at least some known ground contacts.

In an exemplary embodiment, the broad-side surfaces 628b of the mating segments 620b of the ground contacts 56b extend approximately perpendicular to the broad-side surfaces 628a of the mating segments 620a of adjacent signal contacts 56a. For example, the broad-side surfaces 628b of the ground contacts 56b lie within planes (not shown) that are oriented approximately perpendicular to planes (not shown) that the broad-side surfaces 628a of the signal contacts 56a lie within. But, the broad-side surfaces 628b of the mating segments 620b of the ground contacts 56b may extend at any non-parallel angle relative to the broad-side surfaces 628a of the mating segments 620a of adjacent signal contacts 56a.

Figure 16:
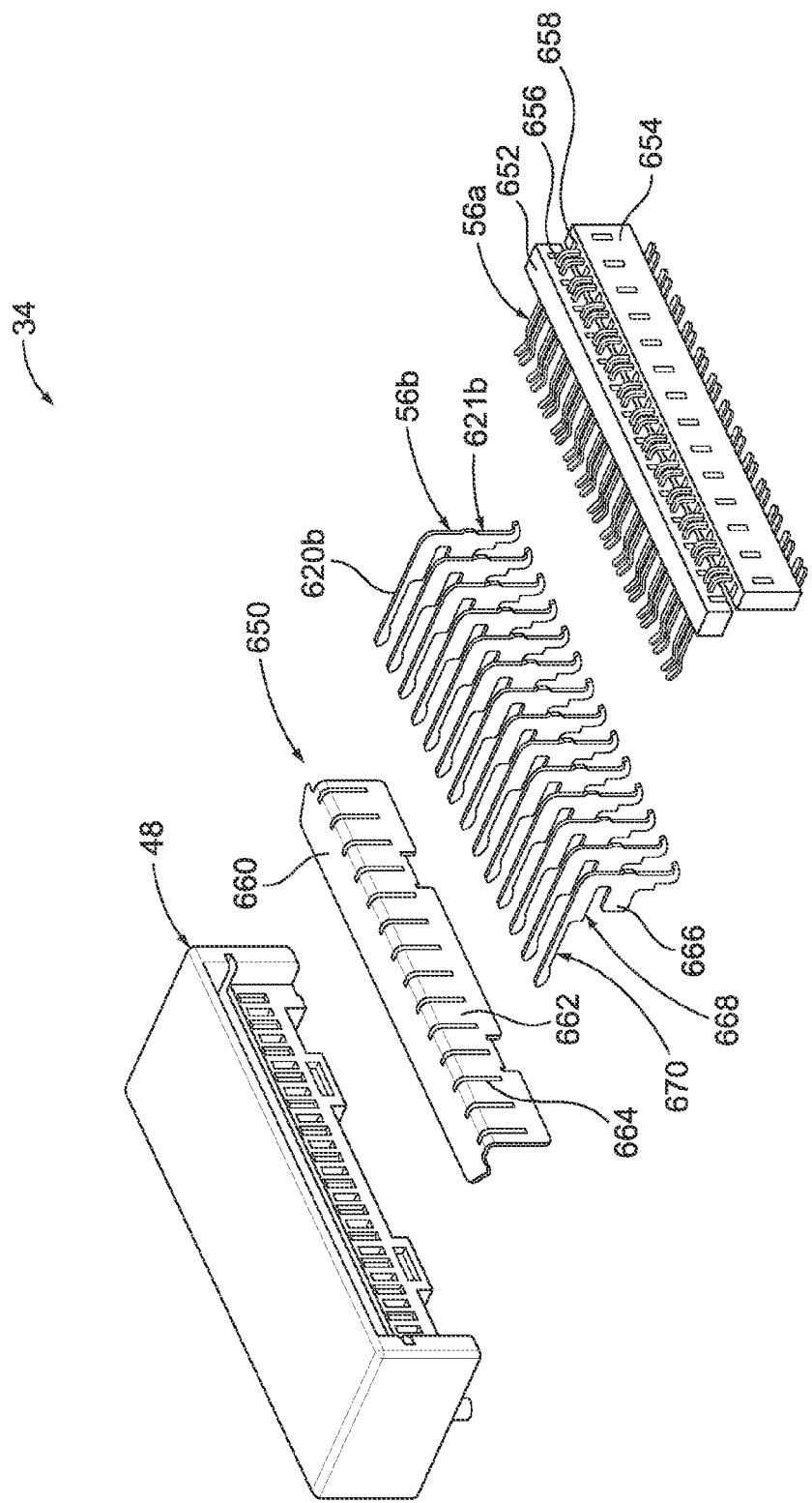
FIG. 16 is a partially exploded perspective view of a portion of the receptacle connector shown in FIGS. 14 and 15.

FIG. 16 is a partially exploded perspective view of a portion of the receptacle connector 34. The electrical contacts 54 (FIGS. 2 and 14) of the receptacle connector 34 are not shown in FIG. 16 for clarity. In addition to the electrical contacts 54, the receptacle connector 34 includes the connector body 48, the electrical contacts 56, and a ground shield 650. Optionally, the signal contacts 56a of the receptacle connector 34 are held by one or more dielectric inserts 652 and 654 that are held by the connector body 48. The inserts 652 and 654 include contact cavities 656 and 658, respectively, through which the signal contacts 56a extend. As can be seen in FIG. 16, the mounting segments 621b of the ground contacts 56b are angled relative to the mating segments 620b. In an exemplary embodiment, the mounting segments 621b are angled approximately perpendicular to the mating segments 620b, but the mounting segments 621b may extend at any non-parallel angle relative to the mating segments 620b.

The ground shield 650 includes a receptacle plate 660 and a body plate 662 that extends from the receptacle plate 660. In an exemplary embodiment, the body plate 662 extends approximately perpendicular to the receptacle plate 660 such that the ground shield 650 has is L-shaped. But the body plate 662 may extend at any angle relative to the receptacle plate 660.

The ground shield 650 includes a plurality of slots 664 that extend through at least the body plate 662. The slots 664 are configured to receive tabs 666 of the mounting segments 621b of the ground contacts 56b. Reception of the tabs 666 within the slots 664 may facilitate aligning the ground contacts 56b (e.g., relative to the ground shield 650, the connector body 48, and/or the signal contacts 56a) and/or may facilitate electrically connecting the ground contacts 56b to the ground shield 650 (e.g., via engagement with walls of the ground shield 650 that define the slots 664). As should be apparent from FIGS. 15 and 16, when the electrical contacts 56 are assembled with the ground shield 650 as shown in FIG. 15, sub-segments 668 of the lengths of the mating segments 620b of the ground contacts 56b are optionally engaged with portions of the receptacle plate 660. Moreover, other sub-segments 670 of the lengths of the mating segments 620b are spaced apart from other portions of the receptacle plate 660. The engagement between the sub-segments 668 and the receptacle plate 660 electrically connects the ground contacts 56b to the ground shield 650, such that the ground contacts 56b and the ground shield 650 are electrically common.

Referring again to FIG. 14, the ground shield 650 is shown with phantom lines. The ground shield 650 extends within the receptacle 50. More specifically, the receptacle plate 660 of the ground shield 650 extends within the receptacle 50 between the row 618 (FIG. 15) of the mating segments 620 of the electrical contacts 56 (FIGS. 2, 15, and 16) and the row 612 of the mating segments 608 of the electrical contacts 54. As can be seen in FIG. 14, the receptacle 50 extends a length $L_{11}$ from an end 672 to an opposite end 674. As should be apparent from a comparison of FIGS. 14 and 15, the length of the row 618 of the electrical contacts 56 extends along the length $L_{11}$ of the receptacle 50.

The ground shield 650 also extends within the connector body 48 of the receptacle connector 34. The ground shield 650 is positioned within the connector body 48 interior to the electrical contacts 54 and 56. The body plate 662 of the ground shield 650 extends within the connector body 48 between the row 623 (FIG. 15) of the mounting segments 621 (FIGS. 15 and 16) of the electrical contacts 56 and the row 611 of the mounting segments 609 of the electrical contacts 54.

Referring again to FIG. 15, the receptacle plate 660 extends along a plane that is approximately parallel to the length of the row 618 of the mating segments 620 of the electrical contacts 56. The receptacle plate 660 of the ground shield 650 overlaps the mating segments 620 of the electrical contacts 56 along the length of the row 618 of the mating segments 620. As should be apparent from a comparison of FIGS. 14 and 15, the receptacle plate 660 of the ground shield overlaps the mating segments 620 within the receptacle 50. Optionally, the receptacle plate 660 of the ground shield overlaps the mating segments 620 of the electrical contacts 56 along an entirety of the length of the row 618 of the mating segments 620. Moreover, the receptacle plate 660 of the ground shield optionally overlaps the mating segments 620 along an entirety of the length of the receptacle 50.

The body plate 662 extends along a plane that is approximately parallel to the length of the row 623 of the mounting segments 621 of the electrical contacts 56. The body plate 662 of the ground shield 650 overlaps the mounting segments 621 of the electrical contacts 56 along the length of the row 623 of the mounting segments 621. Optionally, the body plate 662 overlaps the mounting segments 621 of the electrical contacts 56 along an entirety of the length of the row 623.

The embodiments described and/or illustrated herein may facilitate controlling (e.g., matching) an impedance (which may include controlling both a differential and common mode impedance) of a receptacle connector, a pluggable module, a straddle mount connector, a host circuit board, and/or a transceiver assembly overall. The embodiments described and/or illustrated herein may facilitate reducing an amount of crosstalk, signal attenuation, and/or the like experienced by a receptacle connector, a pluggable module, a straddle mount connector, a host circuit board, and/or a transceiver assembly overall.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A straddle mount connector for edge mounting to a circuit board of a pluggable module, the straddle mount connector comprising:
   a dielectric connector body having a base and a plug extending from the base, the base being configured to be coupled to an edge of the circuit board, the plug having opposite first and second sides and a plate cavity that extends within the plug between the first and second sides, the plug being configured to be received within a receptacle of a receptacle connector;
   electrical contacts held by the connector body, the electrical contacts comprising mating segments, the mating segments of a first group of the electrical contacts being arranged in a first row that extends a length along the first side of the plug, the mating segments of a second group of the electrical contacts being arranged in a second row that extends a length along the second side of the plug; and
   a ground plate held within the plate cavity of the plug of the connector body, the ground plate extending between the first and second rows of electrical contacts along the lengths of the first and second rows.

2. The straddle mount connector of claim 1, wherein the first group of electrical contacts comprises signal contacts and ground contacts, the ground contacts being engaged with and electrically connected to the ground plate such that the ground plate and the ground contacts are electrically common.

3. The straddle mount connector of claim 1, wherein the ground plate extends between the first and second rows of the electrical contacts along an entirety of the lengths of the first and second rows.

4. The straddle mount connector of claim 1, wherein the electrical contacts comprise contact bases coupled to the base of the connector body, the mating segments extending lengths outwardly from the contact bases, the ground plate extending between the first and second rows of the electrical contacts along an entirety of the lengths of the mating segments.

5. The straddle mount connector of claim 1, wherein the first group of electrical contacts comprises signal contacts and ground contacts, the second group of electrical contacts comprising signal contacts and ground contacts, at least one of the ground contacts within the first group comprising a commoning segment that extends along the second side of the plug and engages a ground contact of the second group of electrical contacts in electrical connection therewith.

6. The straddle mount connector of claim 1, wherein the first group of electrical contacts comprises signal contacts and ground contacts, the second group of electrical contacts comprising signal contacts and ground contacts, at least one of the ground contacts within the first group comprising a commoning segment that extends along the second side of the plug and engages a ground contact of the second group of electrical contacts in electrical connection therewith, wherein the commoning segment extends through the plug from the first side to the second side of the plug.

7. The straddle mount connector of claim 1, wherein the ground plate comprises opposite first and second sides that face the first and second sides, respectively, of the plug, the ground plate comprising an edge that extends from the first side to the second side of the ground plate, the first and second groups of electrical contacts each comprising signal contacts and ground contacts, at least one of the ground contacts within the first group comprising a commoning segment that extends along the second side of the plug and engages a ground contact of the second group of electrical contacts in electrical connection therewith, wherein the commoning segment extends from the first side of the ground plate, over the edge of the ground plate, to the second side of the ground plate.

8. The straddle mount connector of claim 1, wherein the plug comprises a layered structure that includes a bottom layer of dielectric material having the second side of the plug, a middle layer defined by the ground plate, and an upper layer of dielectric material having the first side of the plug.

9. The straddle mount connector of claim 1, wherein the first group of electrical contacts comprises signal contacts and ground contacts, the second group of electrical contacts comprising signal contacts and ground contacts, the ground contacts being engaged with and electrically connected to the ground plate such that the ground plate and the ground contacts are electrically common.

10. A straddle mount connector for edge mounting to a circuit board of a pluggable module, the straddle mount connector comprising:
    a dielectric connector body having a base and a plug extending from the base, the base being configured to be coupled to an edge of the circuit board, the plug having a side and being configured to be received within a receptacle of a receptacle connector;
    first and second signal contacts held by the connector body and comprising signal mating segments that are configured to mate with signal mating contacts of the receptacle connector; and
    a ground contact held by the connector body and comprising a ground mating segment that is configured to mate with a ground mating contact of the receptacle connector, the signal and ground mating segments being arranged in a row that extends a length along the side of the plug, the signal and ground mating segments comprising opposite broad-side surfaces and opposite edge-side surfaces that extend between the broad-side surfaces, the broad-side surfaces having a greater surface area than the edge-side surfaces, the ground mating segment being arranged in the row between the signal mating segments of the first and second signal contacts, wherein one of the broad-side surfaces of the ground mating segment faces an edge-side surface of the first signal contact and the other broad-side surface of the ground mating segment faces an edge-side surface of the second signal contact.

11. The straddle mount connector of claim 10, wherein the broad-side surfaces of the ground mating segment are oriented approximately perpendicular to the broad-side surfaces of the signal mating segments.

12. The straddle mount connector of claim 10, wherein one of the edge-side surfaces of the ground mating segment extends coplanar with one of the broad-side surfaces of the first signal contact and extends coplanar with one of the broad-side surfaces of the second signal contact.

13. The straddle mount connector of claim 10, further comprising a third signal contact, the first and third signal contacts being arranged in a differential pair, wherein an edge-side surface of the first signal contact faces an edge-side surface of the third signal contact.

14. The straddle mount connector of claim 10, further comprising third and fourth signal contacts, the first and third signal contacts being arranged in a first differential pair, the second and fourth signal contacts being arranged in a second differential pair, the ground mating segment extending in the row between the first and second differential pairs.

15. The straddle mount connector of claim 10, wherein the side of the plug is a broad side, the plug comprising an edge side that extends from the broad side, the broad side having a greater surface area than the edge side, the row of signal and ground mating segments extending the length along a row axis that extends approximately parallel to the broad side of the plug.

16. A straddle mount connector for edge mounting to a circuit board of a pluggable module, the straddle mount connector comprising:
    a dielectric connector body having a base and a plug extending from the base, the base being configured to be coupled to an edge of the circuit board, the plug having opposite first and second sides, the plug being configured to be received within a receptacle of a receptacle connector; and
    ground contacts held by the connector body and comprising mating segments, the mating segments of a first group of the ground contacts being arranged in a first row that extends along the first side of the plug, the mating segments of a second group of the ground contacts being arranged in a second row that extends along the second side of the plug, wherein at least one ground contact within the first group is engaged with and electrically connected to at least one ground contact within the second group such that the at least one ground contact within the first group is electrically common to the at least one ground contact within the second group.

17. The straddle mount connector of claim 16, wherein the at least one of the ground contact within the first group comprises a commoning segment that extends along the second side of the plug of the connector body and engages the at least one ground contact within the second group.

18. The straddle mount connector of claim 16, wherein the at least one of the ground contact within the first group comprises a commoning segment that extends along the second side of the plug of the connector body and engages the at least one ground contact within the second group, the commoning segment extending through the plug from the first side to the second side of the plug.

19. The straddle mount connector of claim 16, further comprising a ground plate held within the plug of the connector body such that the ground plate extends between the first and second rows of ground contacts, the ground plate comprising opposite first and second sides that face the first and second sides, respectively, of the plug, the ground plate comprising an edge that extends from the first side to the second side of the ground plate, the at least one of the ground contact within the first group comprising a commoning segment that extends along the second side of the plug of the connector body and engages the at least one ground contact within the second group, wherein the commoning segment extends from the first side of the ground plate, over the edge of the ground plate, to the second side of the ground plate.

20. The straddle mount connector of claim 16, further comprising a ground plate held within the plug of the connector body such that the ground plate extends between the first and second rows of ground contacts, the ground contacts being engaged with and electrically connected to the ground plate such that the ground plate and the ground contacts are electrically common.

* * * * *